United States Patent [19]
Massarani

[11] Patent Number: 5,819,540
[45] Date of Patent: Oct. 13, 1998

[54] RICH-QUENCH-LEAN COMBUSTOR FOR USE WITH A FUEL HAVING A HIGH VANADIUM CONTENT AND JET ENGINE OR GAS TURBINE SYSTEM HAVING SUCH COMBUSTORS

[76] Inventor: Madhat Massarani, 2046 Parkview Cir., Hoffman Estates, Ill. 60195

[21] Appl. No.: 912,456

[22] Filed: Aug. 18, 1997

Related U.S. Application Data

[63] Continuation of Ser. No. 413,191, Mar. 24, 1995.

[51] Int. Cl.$^6$ .............................. F02C 3/30; F02C 3/24; F02C 7/30; F02K 9/00
[52] U.S. Cl. ..................... 60/732; 60/39.23; 60/39.29; 60/39.55; 431/4; 431/10; 251/212
[58] Field of Search ................... 60/39.06, 39.26, 60/39.29, 39.5, 39.55, 732, 755, 39.53, 733, 39.23; 431/4, 10, 351; 251/212

[56] References Cited

U.S. PATENT DOCUMENTS

| | | | |
|---|---|---|---|
| 2,523,656 | 9/1950 | Goddard | 60/39.55 |
| 2,636,345 | 4/1953 | Zoller | 60/39.5 |
| 2,649,272 | 8/1953 | Barbato | 251/212 |
| 3,826,078 | 7/1974 | Quigg | 60/732 |
| 4,021,186 | 5/1977 | Tenner | 60/732 |
| 4,054,028 | 10/1977 | Kawaguchi | 60/732 |
| 4,412,414 | 11/1983 | Novick et al. | 60/39.23 |
| 4,427,362 | 1/1984 | Dykema | 431/4 |
| 4,474,121 | 10/1984 | Lewis | 110/346 |
| 4,523,532 | 6/1985 | Moriarty et al. | 110/347 |
| 4,651,534 | 3/1987 | Stroem | 60/732 |
| 4,819,438 | 4/1989 | Schultz | 60/732 |
| 4,958,488 | 9/1990 | Wilkes et al. | 60/39.55 |
| 5,002,483 | 3/1991 | Becker | 60/39.55 |
| 5,052,919 | 10/1991 | Becker | 60/732 |
| 5,215,455 | 6/1993 | Dykema | 431/3 |
| 5,285,628 | 2/1994 | Korenberg | 60/732 |
| 5,319,935 | 6/1994 | Toon et al. | 60/733 |

FOREIGN PATENT DOCUMENTS 0039007   3/1977   Japan ...................................... 60/39.55

OTHER PUBLICATIONS

Van Nostrand's "Scientific Encyclopedia," Sixth Edition, Van Nostrand Reinhold Company, New York, 1983, pp. 1332–1340.

Evans, et al. "The Use of Residual Fuels in Gas Turbines" Proc. 4th World Petroleum Congress, pp. 1–20, 1955.

(List continued on next page.)

*Primary Examiner*—Timothy Thorpe
*Assistant Examiner*—Ted Kim
*Attorney, Agent, or Firm*—Wallenstein & Wagner, Ltd.

[57] ABSTRACT

A combustor for generating hot gas in order to rotate a turbine is able to burn fuel with a high vanadium content without emitting appreciable vanadium pentoxide to the turbine. The combustor includes a primary combustion zone for burning fuel in a rich fuel/air environment a quenching zone for cooling the hot gas and unburned fuel a secondary combustion zone for burning previously-unburned fuel. The fuel burned in the secondary combustion zone raises the temperature in the secondary combustion zone above the temperature of the quenching zone. The result of burning the fuel in a rich environment in the primary combustion zone is that most of the vanadium present in the fuel forms vanadium trioxide or vanadium tetroxide rather than vanadium pentoxide. Cooling the hot gas quickly in the quenching zone removes most of the remaining vanadium pentoxide by transforming it to vanadium trioxide or vanadium tetroxide. The melting point of vanadium trioxide and vanadium tetroxide is substantially higher than the melting point of vanadium pentoxide, which would form troublesome deposits on the combustor walls and on the turbine if it were not removed. Due their high melting points, however, vanadium trioxide and vanadium tetroxide form a fine dust which is swept along with hot gas and thus fouls neither the combustor nor the turbine.

22 Claims, 14 Drawing Sheets

OTHER PUBLICATIONS

Hart et al., "Deposition and Corrosion in Gas Turbine", Applied Science Publishers, London, pp. 23–29, 1973.

Abramov, et al. "Investigation of the combustion of fuel oil with a vanadium–containing ash", pp. 1–20, 1971.

Carlostrom, L.A., et al., "Improved Emissions Performance in Today's Combustion System", International Seminar, pp. 1–18, Jun. 1978.

Hazard, H.R., "NOx Emission from Experimental Compact Combustors", AMSE 72–GT–105, pp. 1–8, Dec. 1971.

RICH-QUENCH-LEAN COMBUSTOR FOR USE WITH A FUEL HAVING A HIGH VANADIUM CONTENT AND JET ENGINE OR GAS TURBINE SYSTEM HAVING SUCH COMBUSTORS

This is a Continuation of application Ser. No. 08/413,191, filed on Mar. 24, 1995, now abandoned.

BACKGROUND OF THE INVENTION

The present invention is directed to combustors for use in gas turbine systems or jet engines, and more particularly to combustors with reduced emission of vanadium pentoxide ($V_2O_5$) even if fuel having a relatively high vanadium content is used. The invention is also directed to gas turbine systems and jet engines having such combustors.

A gas turbine system includes a compressor, one or more combustors which burn fuel using compressed air received from the compressor, and a turbine which is rotated by hot gas generated by the combustor or combustors. The turbine is generally connected to a shaft which drives the compressor. The shaft also supplies power to drive external equipment, such as an electric generator. Three types of combustors are in general use in gas turbine systems. One type is known as a can combustor. Can combustors are usually disposed around the shaft and oriented generally parallel to the shaft, between the compressor and the turbine. Another type, known as radial combustors, are toroidal combustors which are disposed around the shaft, between the compressor and the turbine. The third type, known as silo combustors, are usually located apart from the compressor and turbine instead of between them and around the shaft.

High efficiency can be attained by using a high combustion temperature, which in turn can be achieved by burning the fuel under stoichiometric conditions (that is, just enough air for complete combustion of the fuel). This, however, has several drawbacks. One is that the maximum combustion temperature is typically too hot for the material from which the vanes and so forth of the turbine are made. It is known that this problem can be overcome, at the cost of reduced thermodynamic efficiency, by mixing compressed air with the hot combustion product at a location in the combustor that is downstream from the combustion zone. Another problem is that liquid hydrocarbons typically contain vanadium as a contaminant, and a high combustion temperature causes a large proportion of the vanadium to appear in the combustion products in the form of vanadium pentoxide ($V_2O_5$). This problem will be discussed in more detail below. A third problem is that nitrogen oxide emissions ($NO_x$) are increased when the combustion temperature is high.

In contemporary conventional combustors, $NO_x$ emissions are typically reduced by burning a lean mixture of fuel and air in a primary combustion zone inside the combustor. This reduces the combustion temperature, but carbon monoxide (CO) and unburned hydrocarbons may escape from the primary combustion zone.

It is known that $NO_x$ emissions can be reduced by injecting water into a combustor to cool the hot gas.

Vanadium is the twenty-second most abundant element in the crust of the earth. It has several commercial uses, the primary one being the use of vanadium in steel alloys. Vanadium is frequently present in crude oil, residual fuel oils of the type that are burned in combustion turbine systems, and orimulsion, and cannot be inexpensively removed from such fuels by conventional fuel washing techniques since the vanadium is embedded with the matrix of the liquid fuel oil. One of the oxides of vanadium is $V_2O_5$, which is a sticky, gummy liquid at high temperatures. It tends to form deposits on the stationary and rotating vanes of a turbine. It is customary to shut down combustion turbine systems periodically so that the $V_2O_5$ deposits can be removed from the turbine. Depending on the vanadium content of the fuel used, such shut-downs may occur weekly or, in extreme cases, even daily. Deposits of $V_2O_5$ also tend to form and build up on gas flow channels from the combustors to the turbine and on the inner walls of the combustors themselves. Deposits on the inner walls of the combustors disrupt the heat-flow characteristics of the walls and may cause hot-spots that are severe enough to crack the walls, and furthermore deposits will clog and close openings and passages.

In contemporary conventional combustors, the use of a lean fuel/air mixture reduces $NO_x$ emissions. Furthermore it is known that injecting magnesium-based inhibitors further lowers the combustion temperature and thus further reduces $V_2O_5$ deposits (along with $NO_x$ emissions). However these prior art techniques reduce the thermodynamic efficiency that could otherwise be attained by a combustion turbine system by as much as 20%, and furthermore they are dependent on the use of relatively high-grade fuels that have a low vanadium content to begin with. It is currently not commercially practical to use fuels with a vanadium content of over about 90 parts per million in gas turbine systems because the resulting $V_2O_5$ would cause excessive downtime for deposit removal. Yet fuels such as Orinoco Belt Bitumen, Venezuelan Orimulsion, residual fuel oils, or crude oil (Bunker C), with vanadium contents exceeding 90 ppm, would be readily and inexpensively available if they could be used.

A jet engine also includes a compressor, a combustor which burns fuel using compressed air received form the compressor, and a turbine which is rotated by hot gas from the compressor. The turbine drives the compressor in a multi-shaft arrangement. Unlike a gas turbine system, where the compressor, combustors, and turbine are designed to maximize the energy which the turbine extracts from the hot gas, in a jet engine the elements are designed to maximize the thrust generated by the combustor. Jet engines, like gas turbine systems, suffer from $V_2O_5$ deposits on the turbine and in the combustor if vanadium is present in the fuel.

SUMMARY OF THE INVENTION

A primary object of the invention is to provide a combustor which is able to burn fuel with a relatively high vanadium content without producing excessive quantities of $V_2O_5$. A more particular object is to provide a combustor which is adapted to burn Orinoco Belt Bitumen, Venezuelan Orimulsion, Bunker C, or residual fuel oils with a vanadium content of over 90 per million.

A related object is to provide a combustor which transforms most of the vanadium in the fuel into $V_2O_3$ or $V_2O_4$ rather than $V_2O_5$. Unlike $V_2O_5$, the compounds $V_2O_3$ and $V_2O_4$ are solid up to around 3780° F. Instead of forming a sticky liquid which readily adheres to the walls of the combustors and the vanes and so forth of the turbine, $V_2O_3$ and $V_2O_4$ form small dust particles (not larger than about 20 microns) which are swept along with the exhaust gas.

Another object of the invention is to provide a combustor which reduces $V_2O_5$ deposits by burning a rich fuel/air mixture in a primary combustion zone or by rapidly cooling the products of combustion in a quenching zone. Preferably both techniques are used, with the quenching zone being followed by a secondary burning zone where unburned hydrocarbons are burned and the temperature is raised above that of the quenching zone.

A further object of the invention is to provide a combustor which has low emissions of $NO_x$ and yet which burns fuel at a higher combustion temperature than prior art combustors with low $NO_x$ emissions.

In accordance with one aspect of the invention, a combustor includes a hollow combustor shell having a combustor outlet for releasing hot gas from the interior of the shell. A burner is disposed inside the combustor shell at a primary combustion zone which is spaced apart from the combustor outlet. A means is provided for injecting air into the primary combustion zone so as to burn fuel in a rich fuel/air environment in the primary combustion zone. As a result, hot gas moves from the primary combustion zone toward the combustor outlet and carries unburned fuel along with it. Means are provided for injecting air into a secondary combustion zone, which is disposed between the primary combustion zone and the combustor outlet, so as to burn the unburned fuel from the primary combustion zone.

In accordance with another aspect of the invention, a gas turbine system or a jet engine includes at least one combustor in accordance with the first aspect of the invention, along with a turbine which is rotated by hot gas from the combustor and a compressor which is rotated by the turbine and compresses the air injected into the combustor.

In accordance with another aspect of the invention, a method for burning fuel in a combustor having a hollow combustor shell with a combustor outlet and having a burner which is spaced apart from the combustor outlet includes the step of supplying fuel to the burner, the step of introducing air into a primary combustion zone adjacent the burner while burning a first portion of the fuel in the primary combustion zone, air being introduced into the primary combustion zone at a rate which maintains a rich fuel/air environment in the primary combustion zone, and the step of introducing air into a secondary combustion zone which is disposed between the primary combustion zone and the combustor outlet while burning a second portion of the fuel. The second portion of the fuel is preferably burned in the secondary combustion under stoichiometric or near-stoichiometric conditions.

In accordance with a further aspect of the invention, a method for burning fuel in a combustor having a hollow combustor shell with a combustor outlet and having a burner which is spaced apart from the combustor outlet includes the step of supplying fuel to the burner, the step of burning a first portion of the fuel in a primary combustion zone adjacent the burner, hot gas which includes an unburned second portion of the fuel moving from the primary combustion zone toward the combustor outlet, the step of cooling the hot gas in a quenching zone between the primary combustion zone and the combustor outlet, and the step of raising the temperature of the hot gas in a secondary combustion zone which is between the quenching zone and the combustor outlet by the burning the second portion of the fuel in the secondary combustion zone.

DESCRIPTION OF THE PREFERRED EMBODIMENTS

The various preferred embodiments of the present invention will now be described in detail with reference to the accompanying drawings.

The First Embodiment

Figure 1:
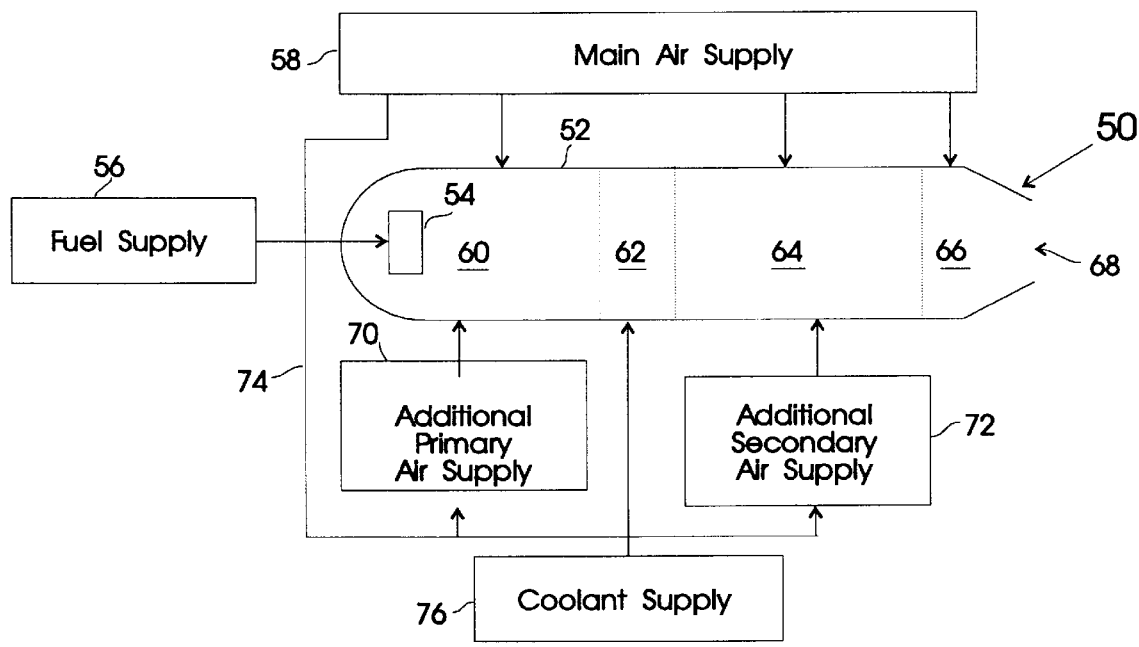
FIG. 1 is a schematic view illustrating a first embodiment of a combustor in accordance with the present invention.

FIG. 1 schematically illustrates a combustor 50 which includes a combustor shell 52 and a burner 54 mounted therein. Burner 54 receives liquid hydrocarbon fuel from a fuel supply 56. A main air supply 58 provides compressed air, through openings (not shown) in combustor shell 52, to a primary combustion zone 60 within shell 52. Hot gases and accompanying unburned fuel move from primary combustion zone 60 through a quenching zone 62 to a secondary combustion zone 64, which also receives compressed air from main air supply 58. Hot gas from secondary combustion zone 64 passes through a mixing zone 66 to a combustor outlet 68. Compressed air from main air supply 58 is injected into mixing zone 66 to mix the hot gas and thereby avoid temperature stratification of the gas reaching the turbine (not shown in FIG. 1), which might damage the turbine.

An additional primary air supply 70 is provided to inject additional compressed air into primary combustion zone 60 and an additional secondary air supply 72 is provided to inject additional compressed air into secondary combustion zone 64. The compressed air injected by the additional primary and secondary air supplies 70 and 72 may be obtained from main air supply 58, as is illustrated schematically by line 74. Main air supply 58 may be a reservoir which receives air from a compressor (not shown in FIG. 1) and the compressed air injected by additional primary and secondary air supplies 70 and 72 may be obtained from the same reservoir.

A coolant supply 76 provides coolant for chilling the quenching zone 62. The coolant is preferably distilled water and it is preferably sprayed into combustor shell 52 at region 62. Other coolants may be employed, however.

The rate at which compressed air is provided directly by main air supply 58 to the primary and secondary combustion zones 60 and 64 is relatively low and is insufficient for complete oxidation of the fuel. The rate of direct delivery from main air supply 58 provides a base which can be adjusted upward to optimum levels by the additional primary and secondary air supplies 70 and 72. For this reason it is convenient to speak of combustion as being controlled by the primary and secondary air supplies 70 and 72, although it must be borne in mind that a slight portion of the compressed air needed for combustion is injected directly into combustor shell 52 by main air supply 58. The primary purpose of the direct injection of air from main air supply 58 is to keep the shell 52 from overheating.

Figure 2:
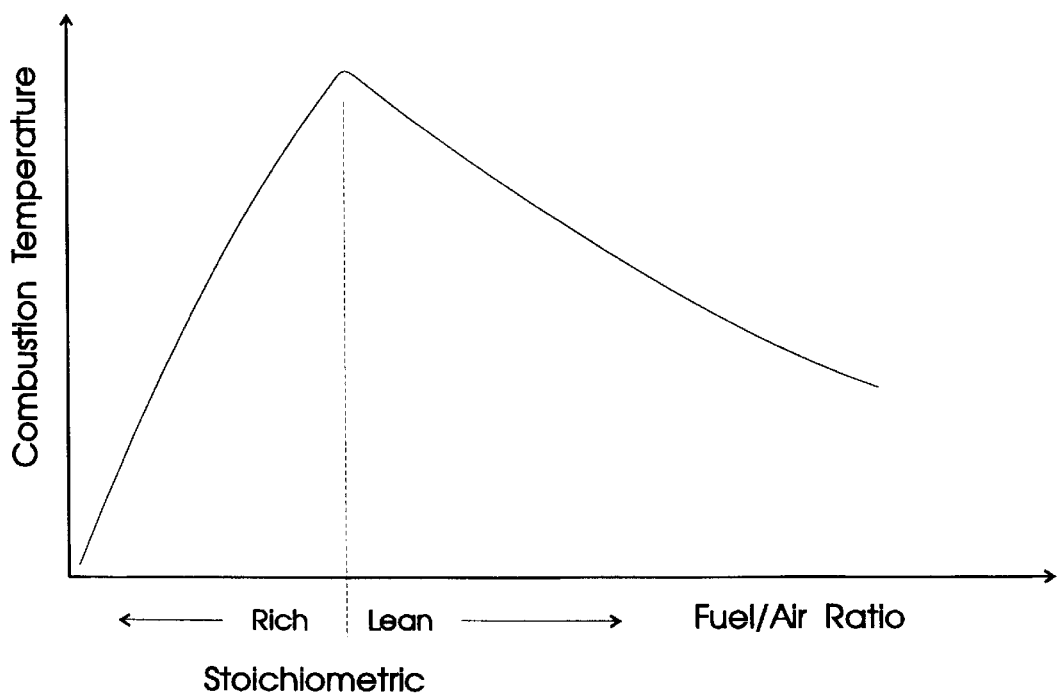
FIG. 2 is a graph showing the combustion temperature as a function of the fuel/air ratio.

The combustion in primary combustion zone 60 is conducted in a rich fuel/air environment. The phrase "rich fuel/air environment" means that not enough air is present for combustion of the fuel under stoichiometric conditions—that is, that the air is insufficient for complete oxidation of the fuel in the primary combustion zone 60 and that the remaining energy in the fuel will be extracted by autoignition thereof in the secondary combustion zone 64. The rate at which primary air supply 70 injects air into primary combustion zone 60 is controlled so as to set the degree of richness in primary combustion zone 60. As will be apparent from FIG. 2, setting the degree of richness also establishes the combustion temperature in primary combustion zone 60.

The fact that the fuel is burned in a rich environment in primary combustion zone 60 has two consequences of interest. First, the combustion temperature is lower than it would be under stoichiometric conditions, and can be adjusted by using additional primary air supply 70 to set the degree of richness. Secondly, the unburned fuel within primary combustion zone 60 includes substantial quantities of carbon (C) and carbon monoxide (CO). Thus, a carbon-rich, reducing environment is encountered by any $V_2O_5$ that is present in primary combustion zone 60 (as would be the case if the fuel is contaminated by significant amounts of vanadium). The following chemical reactions occur at the combustion temperature in primary combustion zone 60:

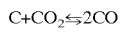

$C+CO_2 \leftrightarrows 2CO$

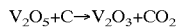

$V_2O_5+C \rightarrow V_2O_3+CO_2$

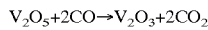

$V_2O_5+2CO \rightarrow V_2O_3+2CO_2$

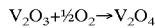

$V_2O_3+\tfrac{1}{2}O_2 \rightarrow V_2O_4$

Most of the $V_2O_5$ is converted to vanadium tetroxide ($V_2O_4$) and vanadium trioxide ($V_2O_3$). The melting points of $V_2O_3$ and $V_2O_4$ are both around 3580° F., which is well above the combustion temperature in secondary combustion zone 64. On the other hand, the melting temperature of $V_2O_5$ is relatively low, around 1250° F. The problem of $V_2O_5$ deposits occurs because of the low melting point of this compound, since $V_2O_5$ forms liquid droplets at the combustion temperature. In contrast, when $V_2O_5$ is converted to $V_2O_3$ and $V_2O_4$ in primary combustion zone 60, these compounds form a fine dust which is carried along with the hot gases and which does not readily stick to combustor shell 52 or the vanes of the turbine (not illustrated).

Although the rich fuel/air environment in primary combustion zone 60 reduces $V_2O_5$ formation, $V_2O_5$ may nevertheless still be present as the hot gas leaves primary combustion zone 60. This is why quenching zone 62 is present. Here, the temperature of the hot gas is lowered quickly, to a predetermined quenching temperature (which may not be below the melting temperature of $V_2O_5$), and this rapid reduction in temperature causes most of the remaining $V_2O_5$ to undergo a chemical reaction, thus, converting it to $V_2O_3$ and $V_2O_4$.

The gas leaving quenching zone 62 is relatively cool, but it intentionally includes unburned hydrocarbons (including C and CO, which should not be released into the atmosphere for environmental reasons). The quenching temperature is high enough to cause these unburned hydrocarbons to spontaneously ignite when they enter secondary combustion zone 64. The rate at which additional secondary air supply 72 injects air into secondary combustion zone 64 is preferably controlled so that the previously unburned hydrocarbons are burned in zone 64 at stoichiometric or near-stoichiometric (but slightly lean) conditions, and completely consumed. Burning the unburned hydrocarbons at stoichiometric or near-stoichiometric conditions in zone 64 raises the gas temperature as much as possible, and also substantially avoids forming $V_2O_5$ from any vanadium in the previously unburned hydrocarbons. However it is noted that a reduced combustion temperature for the unburned hydrocarbons can be attained, if desired, by controlling additional secondary air supply 72 so that combustion occurs in a lean fuel/air environment (that is, more air is present than is necessary to completely oxide the unburned hydrocarbons). As will be seen from FIG. 2, the combustion temperature in secondary combustion zone 64 can be adjusted below the maximum, stoichiometric combustion temperature by adjusting the degree of leanness.

Nitrogen oxide formation increases with temperature and with time. The primary zone combustion temperature is relatively high, although not as high as combustion under stoichiometic conditions. However, the time available for nitrogen and oxygen to react at the primary zone combustion temperature is relatively brief since the temperature drops considerably when the gas has reached quenching zone 62. The presence of quenching zone 62 reduces the time at high temperature and thus $NO_x$ emissions. The temperature is raised again in secondary combustion zone 64, but not to levels high enough to add substantially to the $NO_x$ formed in primary combustion zone 60 since the combustion temperature is lower and no "hot spots" are present in secondary combustion zone 64.

The inventor has conducted an engineering study of a combustor 50 to calculate its performance under typical conditions. In this engineering study, the burner 54 was assumed to receive fuel at a rate of one pound per second. It was also assumed that compressed air was supplied to the primary combustion zone 60 at a rate of 12 pounds per second (from main air supply 58 and additional primary air supply 70 together) and that compressed air was supplied to secondary combustion zone 64 at the rate of 4.21 pounds per second (from main air supply 58 and additional secondary air supply 72 together). Furthermore, it was assumed that compressed air was supplied to mixing zone 66 at a rate 2.66 pounds per second, and that water was fed into quenching zone 62 at a rate of 3 pounds per second. These feed rates were calculated to provide a primary zone combustion temperature of 3063° F., a quenching zone temperature of 1400° F., and a secondary zone combustion temperature of 1938° F. These results lead to the conclusion that combustor 50 is more thermodynamically efficient than conventional combustors with low $NO_x$ emissions. Furthermore, combustor 50 converts most, if not all, of the vanadium present in the fuel into powdered $V_2O_3$ or $V_2O_4$. Conventional combustors, in contrast, spew forth sticky $V_2O_5$ in liquid form if appreciable vanadium is present in the fuel.

The Second Embodiment

Figure 3:
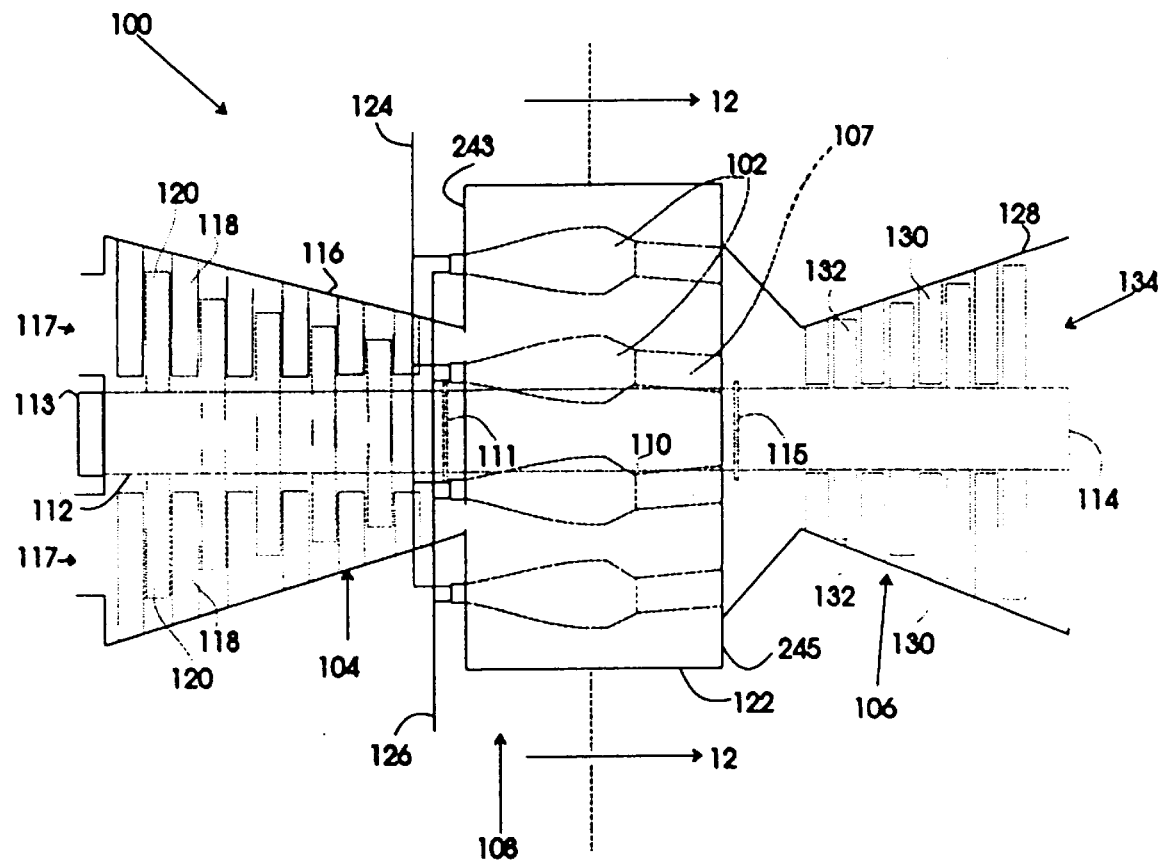
FIG. 3 is a front plan view schematically illustrating a gas turbine system having combustors in accordance with a second embodiment of the present invention.

A gas turbine system 100 which includes combustors 102 in accordance with a second embodiment of the invention is shown in FIG. 3. Combustors 102 represent a practical design for implementing the principles discussed above with respect to the first embodiment. Combustors 102 are can combustors, but the invention is equally applicable to radial and silo combustors.

Gas turbine system 100 includes a compressor portion 104, a turbine portion 106, and a combustion portion 108 between the compressor and turbine portions 104 and 106. A torque tube 110 extends axially through combustion portion 108. One end of torque tube 110 is jointed at a flange connection 111 to a compressor rotor 1 12. During normal use, the outer end 113 of compressor rotor 112 is coupled to external equipment such as an electrical generator (not illustrated) which is driven by gas turbine system 100. A turbine rotor 114 is jointed at a flange connection 115 to the other end of torque tube 110.

Compressor portion 104 includes a compressor housing 116 with an annular air intake opening 117. Stationary compressor vanes 118 cooperate with rotating compressor vanes (blades) 120 which are mounted on rotor 112 to compress incoming air and deliver the compressed air into the housing 122 of combustion portion 108. Combustion portion 108 also receives liquid hydrocarbon fuel via a fuel conduit 124 and distilled water via a coolant conduit 126. Conduit branches (not numbered) carry fuel and water from conduits 124 and 126 to each of the combustors 102. The interior of combustion portion housing 122 serves as a reservoir for compressed air received from compressor portion 104, and corresponds to main air supply 58 in the first embodiment. Hot gas generated by combustors 102 is conveyed by a transition member 107 to turbine portion 106, which has a turbine portion housing 128. Turbine portion 106 includes stationary turbine vanes 130 connected to housing 128 and rotating turbine vanes 132 connected to rotor 114. The exhaust gas exits turbine portion housing 128 through an outlet opening 134.

Figure 7:
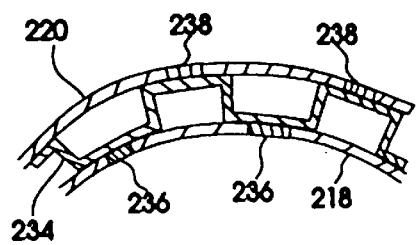
FIG. 7 is a sectional view illustrating a portion of two shell members and a corrugated spacer sheet between them to permit air to enter the combustor.

The construction of a combustor 102 will now be described in detail with reference to FIGS. 4–7. Combustor 102 includes a hollow combustor shell 200 which is formed by a generally funnel-shaped burner holder 202, nine cylindrical shell members 204, 206, 208, . . . , 220, a cylindrical mixer band 226, and a generally funnel-shaped outlet member 228 having a collar 230. Outlet member 228 is open-ended to provide a combustor outlet 232. Shell members 204, 206 . . . , 220 have progressively greater diameters and are telescopically assembled with corrugated spacer rings 234 between them. FIG. 7 shows an example of how they are connected. In FIG. 7, a spacer ring 234 between shell members 218 and 220 is joined to shell member 218 by spot welds 236 and is joined to shell member 220 by spot welds 238. The other spacer rings 234 are also spot welded to their respective shell members. It is noted that the height of the corrugations in spacer rings 234 has been exaggerated in FIG. 5, and that the spacer rings have been omitted in FIG. 6, to permit convenient illustration. The corrugations in spacer rings 234 allow compressed air to enter into the interior of combustor shell 200. The flow of compressed air into combustor 102 via the corrugations is rather small; the purpose of this flow is to keep combustor shell 200 from overheating rather than to supply sufficient air for combustion of the fuel. Compressed air can also enter via other avenues, as will be discussed later.

A mounting ring 240 is connected to burner holder 202 and has openings 242 for receiving bolts (not illustrated) to connect the combustor 102 to the left end wall 243 (see FIG. 3) of combustor portion housing 122. Mounting ring 240 also has openings (not numbered) through which four water tubes 244 extend. Tubes 244 receive water from coolant conduit 126 (see FIG. 3). A burner 246 is mounted on holder 202 and receives fuel through fuel inlet 123 from fuel conduit 124 (see FIG. 3). Openings 248 admit compressed air to the burner 246. A socket 250 for receiving an igniter (not illustrated) is mounted on burner holder 202, as are a pair of cross flame fittings 252. Not all of the combustors 102 have igniters; cross flame fittings 252 are coupled to cross flame tubes (not illustrated) to convey hot gas for igniting fuel that is supplied to combustors 102 which lack their own igniters.

Figure 6:
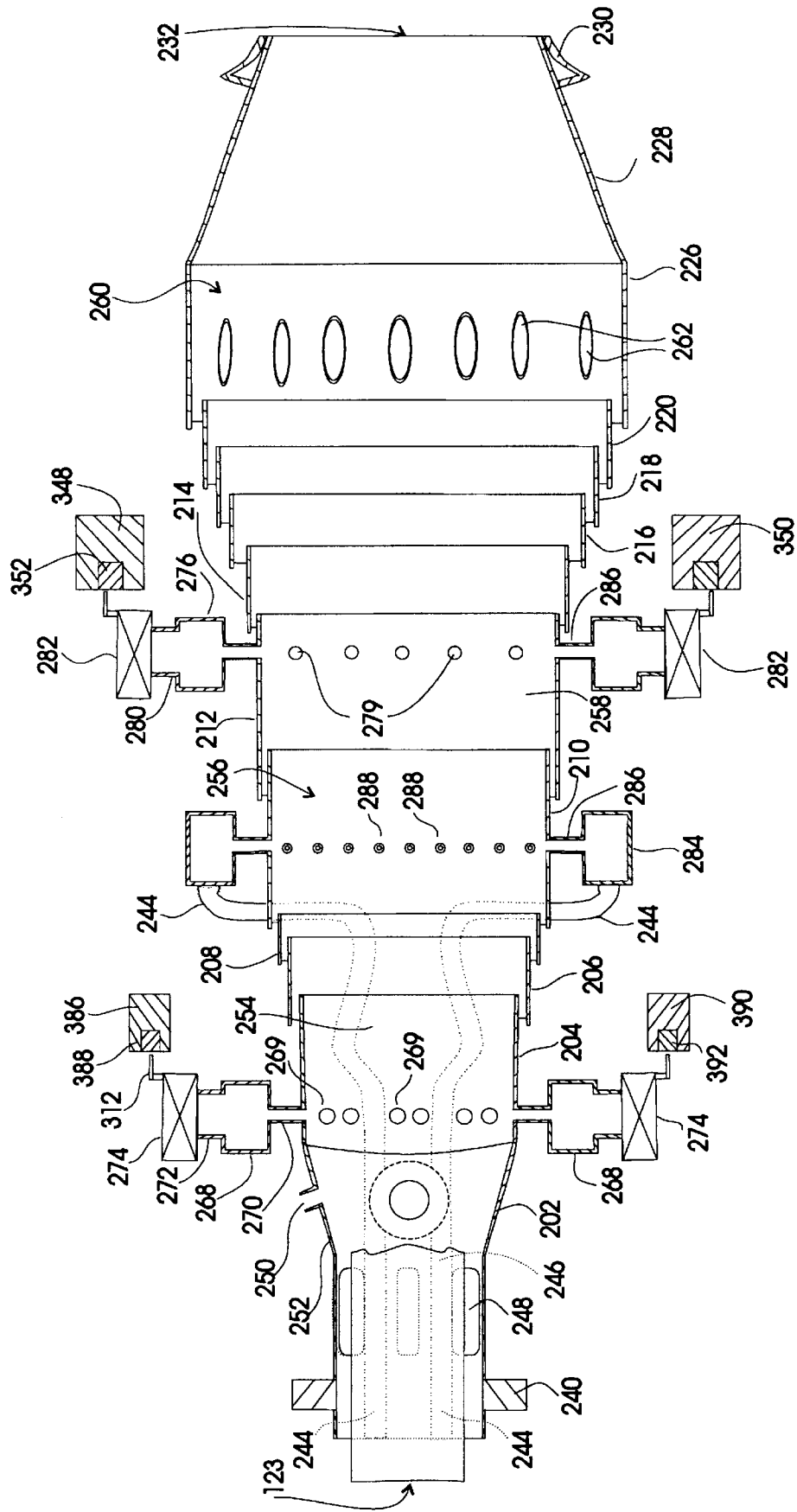
FIG. 6 is a longitudinal sectional view of the combustor of the second embodiment, and additionally illustrates the rails.
Figure 8:
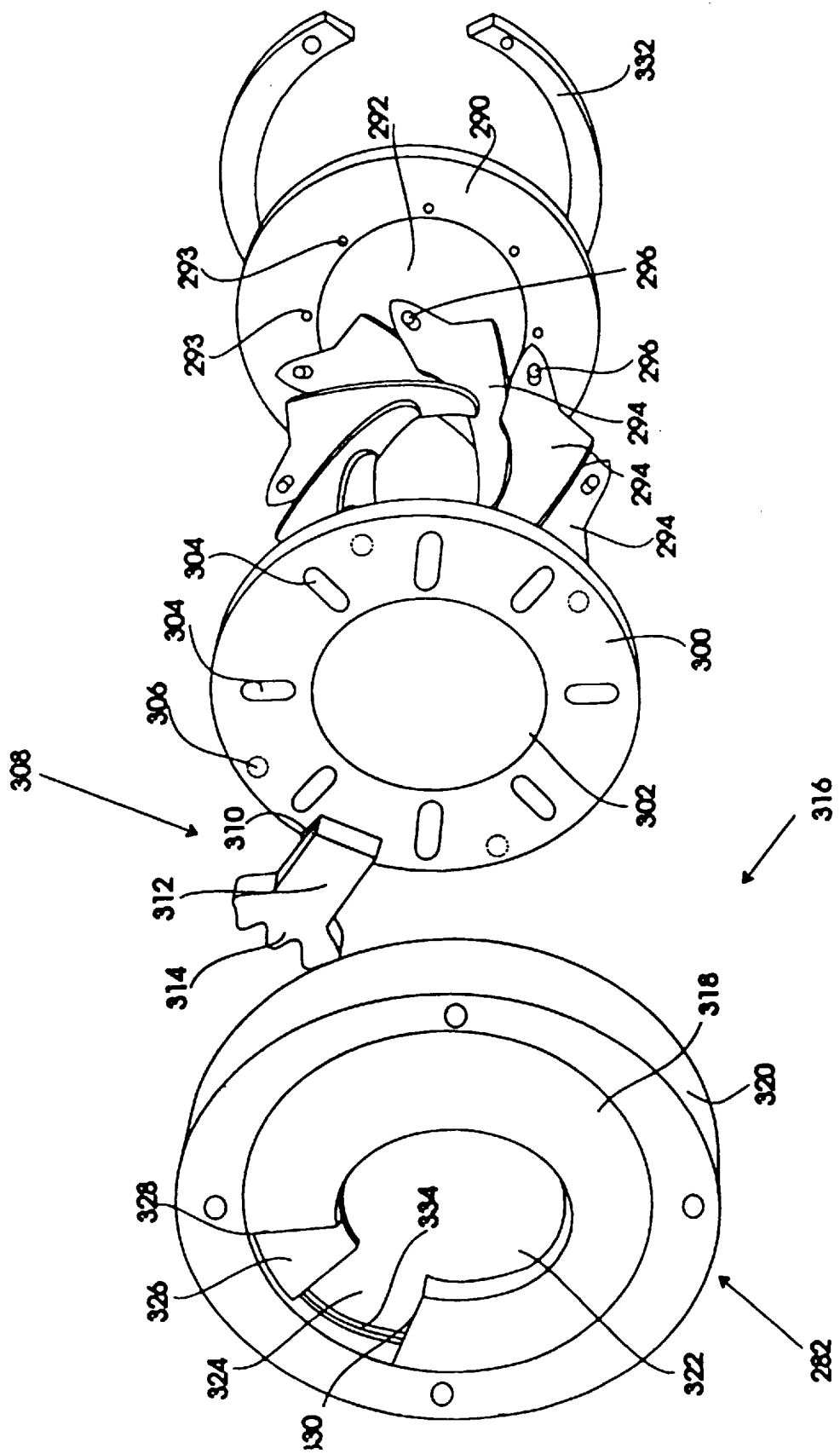
FIG. 8 is an exploded perspective view illustrating a control valve for controlling the injection of additional air.
Figures 9, 10, 11:
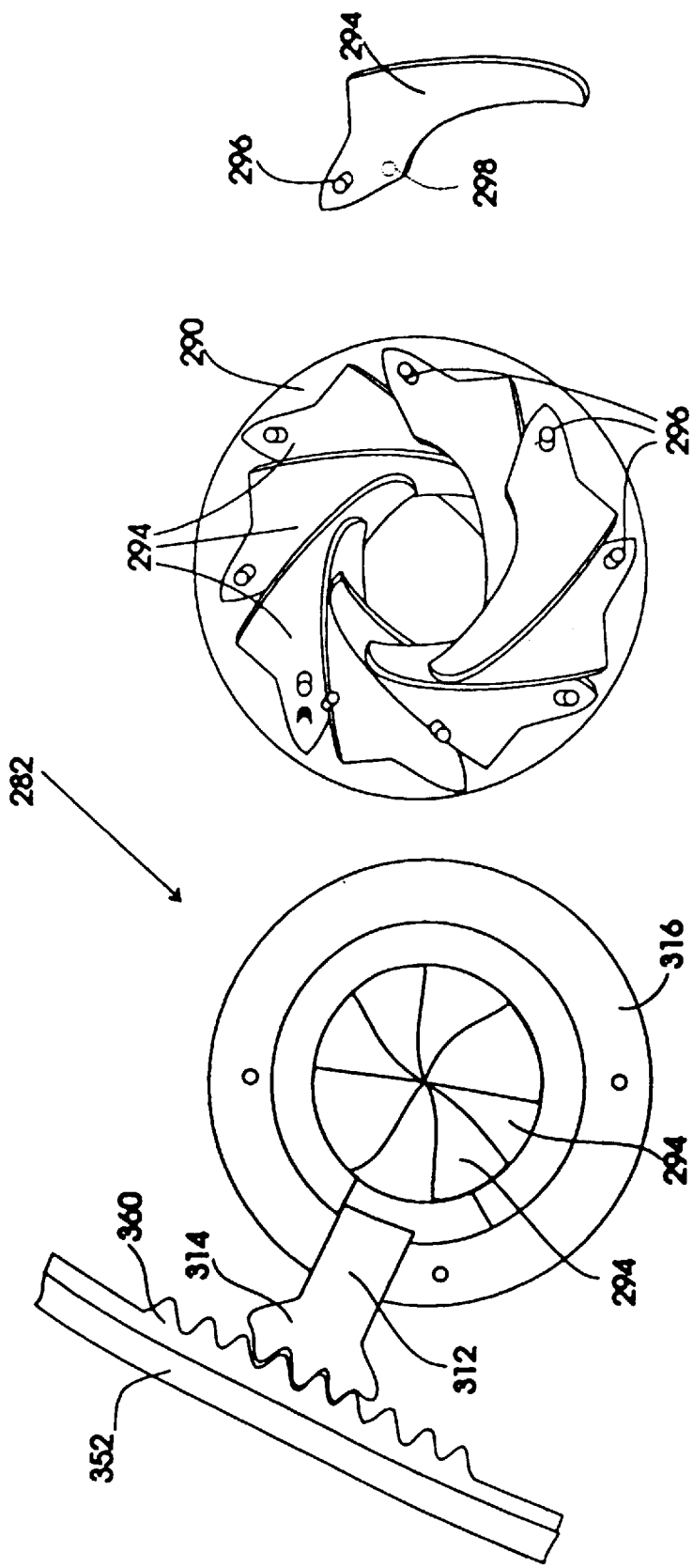
FIG. 9 is a top plan view of a movable leaf employed in the control valve of FIG. 8.
FIG. 10 is a top plan view of leaves installed on a stationary member in the control valve of FIG. 8.
FIG. 11 is a top plan view of the control valve, and additionally shows a toothed region on a portion of an adjustment ring.

As is shown in FIG. 6, the interior of combustor 102 has a primary combustion zone 254, a quenching zone 256, a secondary combustion zone 258, and mixing zone 260. Air scoops 262 in mixer band 226 admit compressed air into mixing zone 260.

The openings 248 in burner holder 202 and the air passages provided by the corrugations of the spacer rings 234 have a total cross-sectional area which is too small to admit enough air into the primary and secondary combustion zones 254 and 258 for total combustion of the fuel. The air admitted into these zones via openings 248 and the corrugations of the spacer rings 234 provides a base level which can be adjusted upward by an additional primary air supply mechanism 264 (for primary combustion zone 254) and by an additional secondary air supply mechanism 266 (for secondary combustion zone 258). The additional primary air supply mechanism 264 includes an annular distribution conduit 268 which is connected to shell member 204 at holes 269 by radial pipes 270. Air admission conduits 272 are connected at their inner ends to distribution conduit 268 and have control valves 274 at their outer ends. As will be discussed in more detail later, control valves 274 can be varied to control the injection of additional primary air to the primary combustion zone 254 via air admission conduits 272, distribution conduit 268, and pipes 270.

The construction of additional secondary air supply mechanism 266 is similar. It includes an annular distribution conduit 276 which is connected by radial pipes 278 to shell member 212 at holes 279. Two air admission conduits 280 are connected to distribution conduit 276. Control valves 282 are mounted on conduits 280 at the outer ends thereof. Control valves 282 can be varied to adjust the rate at which additional secondary air is supplied to secondary combustion zone 258 via admission conduits 280, distribution conduit 276, and pipes 278.

Water tubes 244 convey water to an annular water distribution conduit 284 which is connected by radial pipes 286 to shell member 210. Spray nozzles 288 spray the water toward the center of quenching zone 256. Although not shown, water distribution conduit 284 preferably has internal baffles to equalize the water pressure in conduit 284 from the top to the bottom, so that the pressure at each of the nozzles 288 is approximately equal despite their different heights.

The construction of control valves 282 will now be described with reference to FIGS. 8–11. The construction of control valves 274 is the same.

A control valve 282 includes an annular stationary member 290 having a central air passage opening 292 and eight mounting holes 293 around the periphery of opening 292. Eight control leaves 294 are provided, each having a peg 296 protruding from its upper side and a peg 298 protruding from its lower side. An annular rotatable member 300 has a central opening 302 for passage of air and eight radially disposed mounting slots 304. The pegs 298 are received by mounting holes 293 in stationary member 290 and the pegs 296 are received in slots 304 in rotatable mounting member 300. It will be apparent that, by varying the angular position of rotatable member 300 with respect to stationary member 290, the leaves 294 can be simultaneously pivoted about their pegs 298. When they are pivoted inward they obstruct the central openings 292 and 302 in members 290 and 300 by an amount which depends upon the angular relationship of these members. The arrangement is similar in principle to the aperture-setting mechanism found in some cameras. Depressions 306 are stamped into member 300 to provide spacers for setting the distance between members 300 and 290 so that the leaves 294 will not be pinched between these members.

A setting element 308 has a neck portion 310 which is connected to member 300 and a radial portion 312 which terminates in a toothed member 314. A cap 316 includes an outer wall 318 and a cylindrical wall 320 which extends from one side of outer wall 318. Outer wall 318 has a central opening 322 and a radial opening 324 which communicates with the central opening 322, the openings 322 and 324 together having a generally key-hole shape. Outer wall 318 has a reduced-thickness segment 326 adjacent opening 324. The thickness of outer wall 318 increases abruptly after segment 326 to provide a stop 328. An edge of outer wall 318 on the other side of opening 324 provides a second stop 330.

Rotatable member 300, leaves 294, and stationary member 290 are stacked inside cylindrical wall 320 and retained within cap 316 by C-ring 332 which snaps into a groove 334 in cylindrical wall 320. Neck portion 310 of setting element 308 protrudes through opening 324 to support radial portion 312 outside of cap 316.

Figure 12:
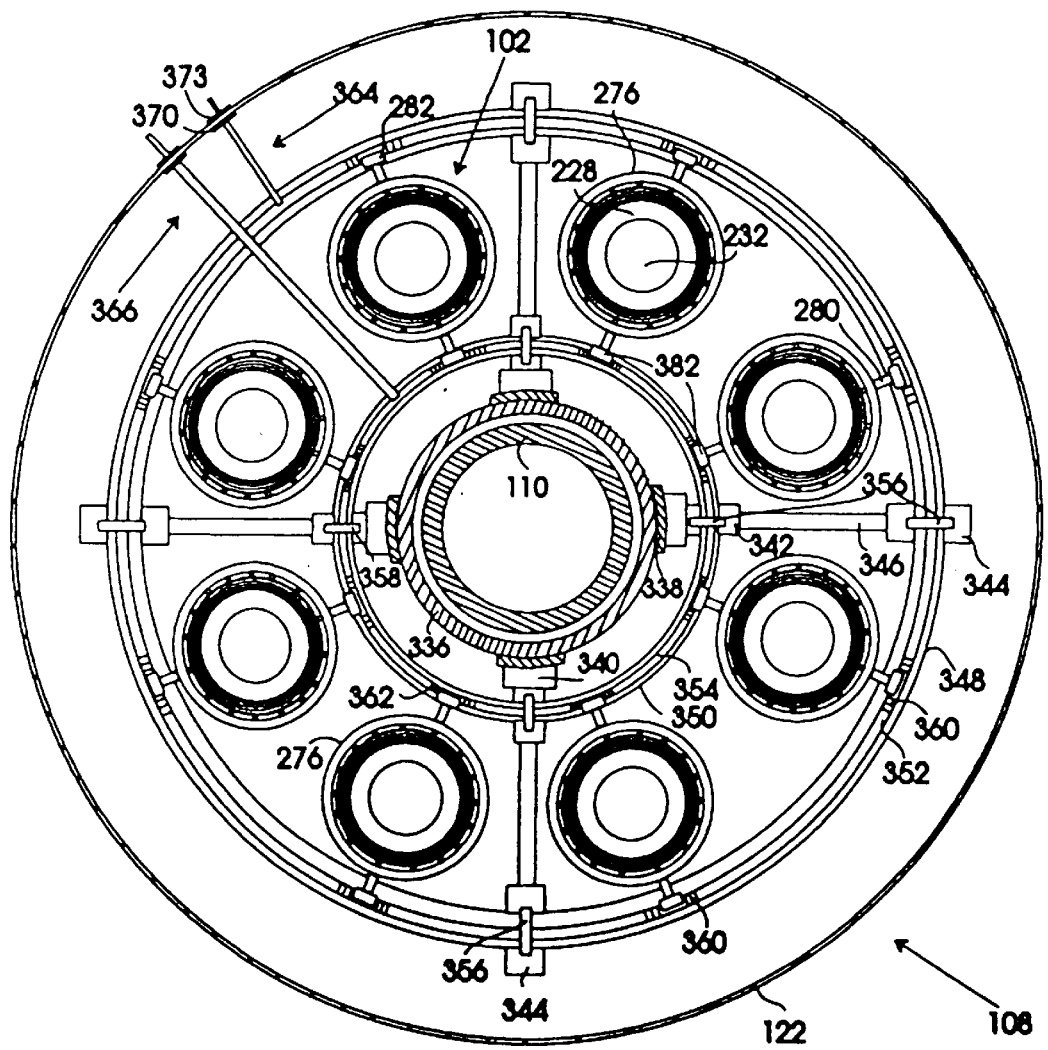
FIG. 12 is a sectional view taken along line 12—12 of FIG. 3.

An adjustment system for adjusting the additional secondary air supply mechanism 266 will now be described with reference to FIGS. 12 and 13. It is noted that the sectional plane in FIG. 12 passes through the combustors 102 at a position between and their water distribution conduits 284 and their distribution conduits 276 (which are thus shown in FIG. 12).

One end of a support tube 336 which is concentric with the torque tube 110 is connected to left end wall 243 (see FIG. 3) of the combustor portion housing 122. The other end of support tube 336 is connected to right end wall 245 (see FIG. 3) of housing 122. Four bracing strips 338 are connected to support tube 336. A pedestal 340 is connected to each bracing strip 338 and an inner ring mount 342 is connected to each pedestal 340. Outer ring mounts 344 are connected to the inner ring mounts 342 by shafts 346. A stationary outer ring 348 is connected to the outer ring mounts 344 and a stationary inner ring 350 is connected to the inner ring mounts 342. Outer ring 348 has a slot (see FIGS. 4 and 6, where the slot is shown but not numbered) which carries an outer adjustment ring 352. Similarly, inner ring 350 has a slot (see FIGS. 4 and 6, where again the slot is not numbered) which carries an inner adjustment ring 354. The adjustment ring 352 is retained in the slot in ring 348 by metal straps 356 which are connected to the ring mounts 344 and, similarly, adjustment ring 354 is retained in the slot in ring 350 by metal straps 358 which are connected to ring mounts 342. Adjustment ring 352 has eight toothed regions 360, or racks of teeth, which are positioned to engage the toothed members 314 of the outer control valves 282. Similarly, inner adjustment ring 354 is provided with eight toothed regions 362 which are positioned for engagement by the toothed members 314 of the inner control valves 282. As will be discussed in more detail below, the adjustment rings 352 and 354 are rotatable in unison (in opposite directions but by equal angles) by ring rotation mechanisms 364 and 366, which are part of the adjustment system for adjusting the additional secondary air supply mechanism 266. It will be apparent that rotation of the adjustment rings in this manner is communicated via toothed regions 360 and 362 to the control valves 282 to adjust the positions of the leaves 294 therein and thus control the effective apertures of the control valves 282.

Figure 13:
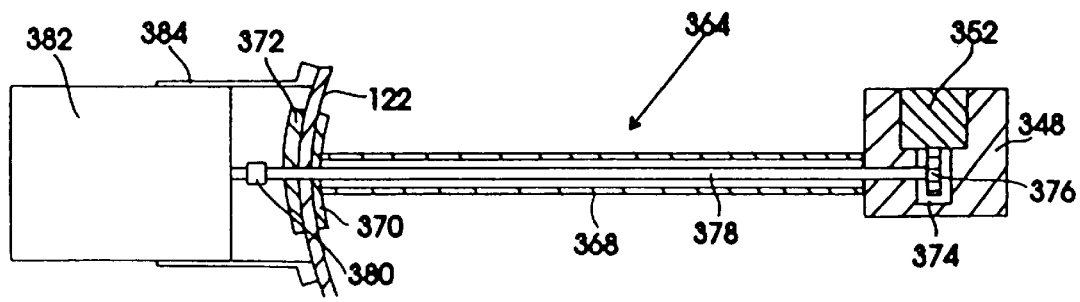
FIG. 13 is a side view, partially in section, of a ring rotation mechanism.

Ring rotation mechanism 364 is shown in FIG. 13. It includes a pipe 368 having an inner end which is connected to stationary ring 348 and an outer end which is connected to a flange 370 abutting the inner surface of combustor portion housing 122. A flange 372 abuts the outer surface. Although not shown, flanges 370 and 372 are bolted together through openings in housing 122.

Ring 348 is machined in the vicinity of pipe 368 to provide a cavity 374 which communicates with the slot holding adjustment ring 352. A gear 376 is disposed in cavity 374 and meshes a rack of teeth (not illustrated) provided on the underside of adjustment ring 352. Gear 376 is connected to a shaft 378 which extends through an opening in the side of ring 348, though pipe 368, and through openings in flange 370, housing 122, and flange 372. A coupling 380 connects the outer end of shaft 378 to the shaft of a gear motor 382 (that is, a motor with internal reduction gearing), which is mounted on housing 122 by brackets 384. It will be apparent that rotation of the motor is conveyed via shaft 378 and gear 376 to adjustment ring 352. It is noted that gear motor 382 is not shown in FIG. 14, nor is a gear motor for ring rotation mechanism 366.

A similar adjustment system is used for adjusting the additional primary air supply mechanism 264. It includes an outer stationary ring 386 (see FIGS. 4 and 6) with a slot (not numbered) for receiving an outer adjustment ring 388 and an inner stationary ring 390 with a slot (not numbered) for carrying an inner adjustment ring 392. The stationary rings 386 and 390 are mounted on support tube 336 by an arrangement like that shown in FIG. 12, and the adjustment rings 388 and 392 are rotated by respective ring rotation mechanisms like the one shown in FIG. 13. The main difference from the adjustment system for adjusting the additional secondary air supply mechanism 266 is that the diameters of the rings are slightly different from what is shown in FIG. 12, as will be appreciated from FIGS. 4 and 6.

Figure 14:
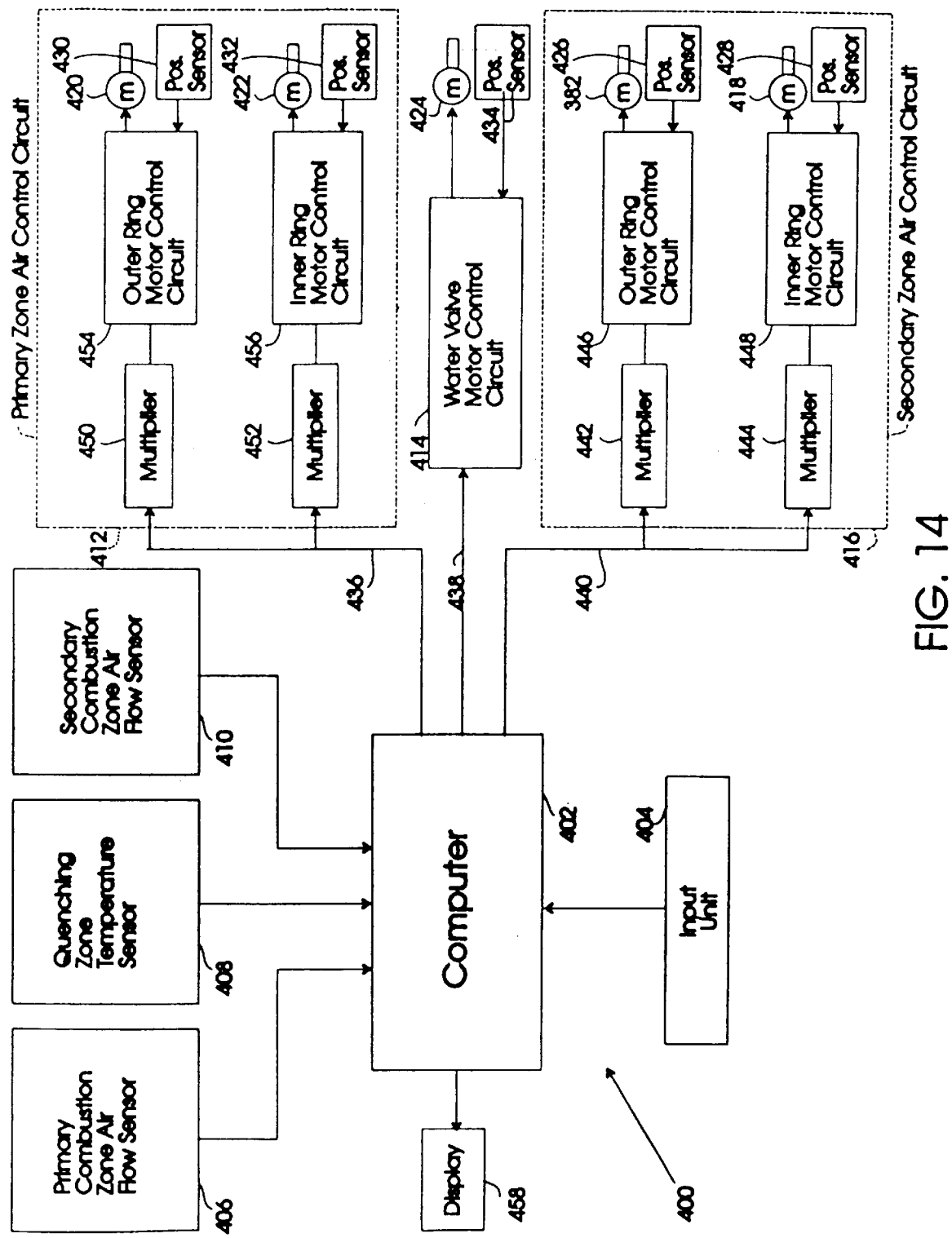
FIG. 14 is a block diagram of an electrical control system for the second embodiment.

A simplified electrical system for controlling the combustion portion 108 will now be described with reference to FIG. 14. A more sophisticated system will be explained in the next embodiment.

A control system 400 includes a computer 402 which is connected to an input unit 404 such as a keyboard. Computer 402 is likewise connected to a primary combustion zone airflow sensor 406, a quenching zone temperature sensor 408, and a secondary combustion zone temperature sensor 410. These sensors sense conditions at one of the combustors which is selected for monitoring. Secondary combustion zone temperature sensor 410 may comprise a platinum wire resistance element which is provided with a protective ceramic coating and which is mounted in the secondary combustion zone 258 of the monitored combustor 102 in order to sense the temperature therein. Sensor 408 may likewise comprise a platinum wire resistance element with a protective ceramic coating. Sensor 408 is mounted in the quenching zone 256 of the monitored combustor. Due to the high temperature in primary combustion zone 254, the temperature here is not sensed directly. Instead, an airflow sensor is mounted in one of the air admission conduits 272 leading to the monitored combustor. Airflow sensor 406 may comprise a small vane wheel which is mounted for rotation by the incoming air and which is coupled to a magnetic sensor that emits pulses at a frequency corresponding to the rotation rate of the vane wheel.

Computer 402 generates command signals which are provided to a primary combustion zone air control circuit 412, a water valve motor control circuit 414, and a secondary combustion zone air control circuit 416. Control circuit 416 drives motor 382 (see FIG. 13), which is part of the ring rotation mechanism 364 for the outer adjustment ring 352. A gear motor 418 drives ring rotation mechanism 366 (motor 418 is not illustrated in FIG. 12). As was noted previously, the additional primary air supply mechanism 264 (see FIG. 4) includes an outer adjustment ring 388 and an inner adjustment ring 392, and the ring rotation mechanisms for rotating these adjustment rings are the same as that shown in FIG. 13. The ring rotation mechanism for outer ring 388 includes a gear motor 420 and the ring rotation mechanism for the inner ring 392 includes a gear motor 422.

The water supplied to water tubes 244 is controlled by a water valve (not illustrated) that is operated by a gear motor 424.

A position sensor 426 is mechanically linked to the shaft of motor 382. Similarly, positions sensors 428, 430, 432, and 434 are mechanically linked to the shafts of motors 418, 420, 422 and 424. The position sensors are preferably disposed within the housings of the motors.

Computer 402 emits a primary combustion zone air command signal to control circuit 412 on line 436, a water rate command signal to control circuit 414 on line 438, and secondary combustion zone air command signal to control circuit 416 on line 440. Multipliers 442 and 444 in control circuit 416 receive the secondary combustion zone air command signal, which designates the desired angular positions of adjustment rings 352 and 354, and multiply it by compensation factors which cause the rings 352 and 354 to move by equal angular amounts but in different directions. The compensation factor by which multiplier 442 multiplies the command signals is the value of the diameter of outer adjustment ring 352. The compensation value by which multiplier 444 multiplies the command signal is the value of the diameter of the inner adjustment ring 354, times minus one. The compensated command signal from multiplier 442 is provided to an outer ring motor control circuit 446, which drives motor 382 in a position-control servo arrangement until position sensor 426 detects that the position of the shaft of motor 382 corresponds to the compensated command signal. Similarly, the compensated command signal from multiplier 444 is supplied to an inner ring motor control circuit 448, which drives motor 418 until position sensor 428 detects that the position of the motor's shaft corresponds to the compensated command signal. During operation, the motors 382 and 418 rotate adjustment rings 352 and 354 within an adjustment range which is limited to about five degrees in this embodiment, although larger adjustment ranges may be used.

In a similar manner, control circuit 412 includes multipliers 450 and 452 which multiply the primary combustion zone air command signal by appropriate compensation factors. The compensation factor applied by multiplier 450 corresponds to the value of the diameter of outer adjustment ring 388, and the compensation factor applied by multiplier 452 corresponds to the diameter of inner ring 392, times minus one. The compensated command value from multiplier 450 is received by an outer ring motor control circuit 454, which drive motor 420 until position sensor 430 detects that the shaft of motor 420 corresponds to the compensated command signal. An inner ring motor control circuit 456 receives the compensated command signal from multiplier 452 and drives motor 422 until its shaft reaches a position corresponding to the compensated command signal. The angular range by which control circuit 412 is able to adjust the rings 388 and 392 is about five degrees in this embodiment, although larger adjustment ranges may be used.

The control system 400 may also include a display 458 such as a monitor for displaying values supplied by input unit 404, values sensed by the sensors 406–410, and so forth.

Figure 15:
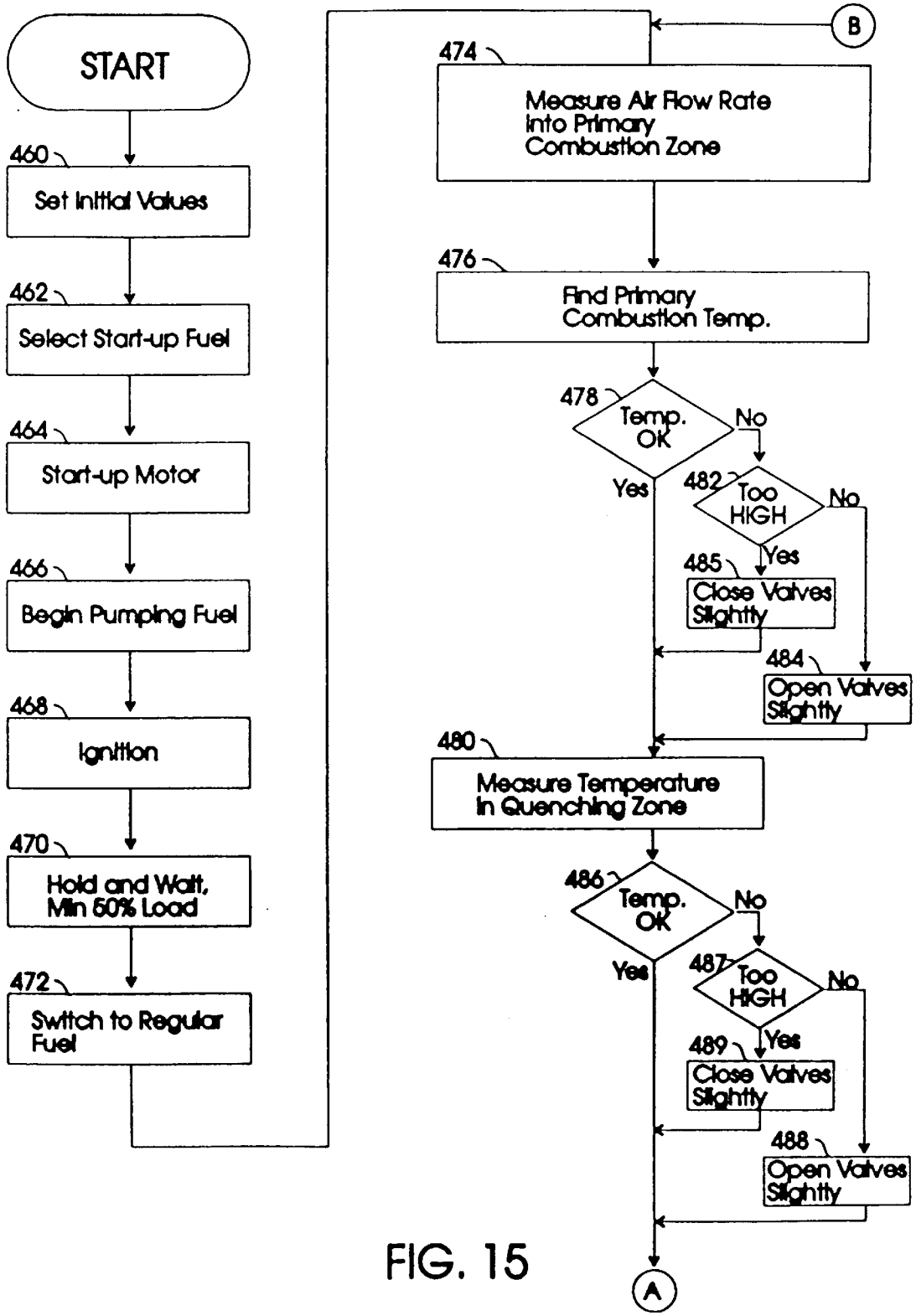
FIG. 15 and 16 are a flow chart for a program executed by the computer in FIG. 14.
Figure 16:
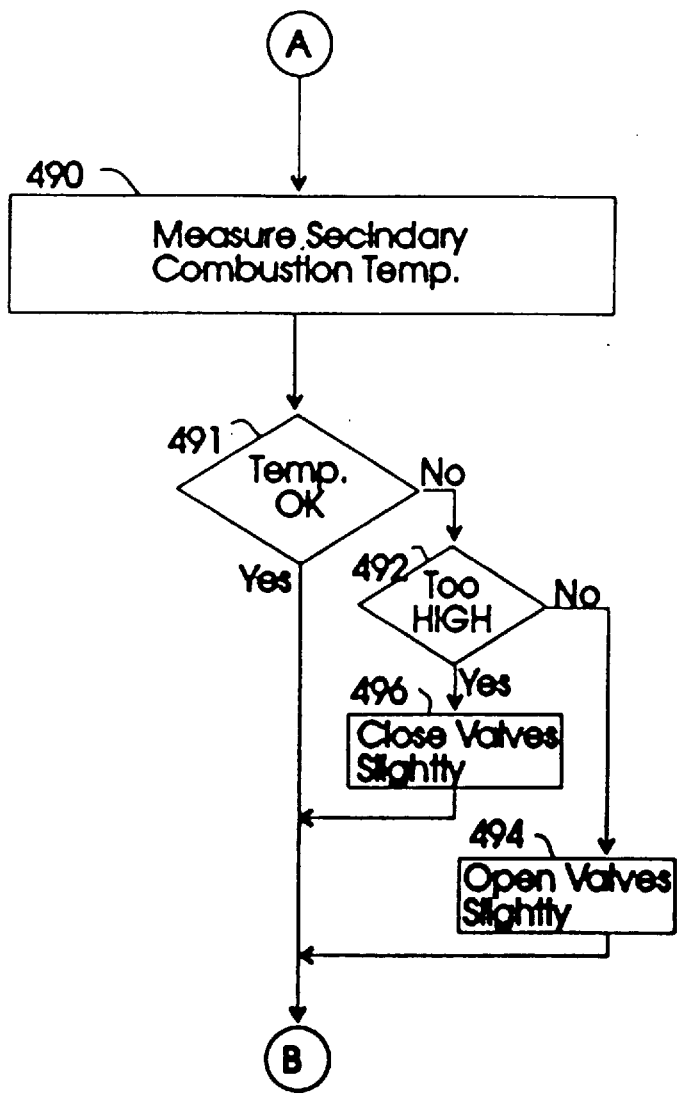

The program executed by computer 402 will now be described with reference to FIGS. 15 and 16. In step 460, initial values for the apertures of control valves 274 and 282 (see FIG. 6) are set by way of input unit 404. These initial values may be, for example, 50% of the maximum valve apertures. During step 460, an initial value for the flow rate of water into quenching zone 256 is also set. A typical initial value might be three pounds of water per second per combustor 102. Target values for the temperature in primary combustion zone 254, quenching zone 256, and secondary combustion zone 258 are also stored during step 460. Typical values might be 3063° F., 1400° F., and 1938° F., respectively. A fuel flow rate is also set. A typical value might be one pound of fuel per second per combustor 102.

In the present embodiment, the gas turbine system 100 is started from rest using a high-quality, low-vanadium fuel such as kerosene or fuel oil No. 2, and is later switched to a lower grade fuel after the gas turbine system 100 has reached about 75% of the power output for which it is designed. In step 462, a source of the high-quality fuel is coupled to burner 246.

An external mechanism (not illustrated) is coupled to rotor 112 in step 464 and begins rotating it. As a result, turbine portion 106 begins supplying compressed air to combustion portion 108. When the compressed air delivery rate becomes sufficient, a fuel valve (not illustrated) is opened in step 466 so that the high-quality fuel begins to be pumped to the combustors 102. The fuel is ignited in step 468, and after a wait at step 470 to permit the combustion turbine system 100 to reach 75% of its designed output, the fuel supplied to the system 100 is switched from the high-quality start-up fuel to regular fuel in step 472. As a result of steps 460–472, gas turbine system 100 is brought near the region of its normal operation using fuel which does not result in $V_2O_5$ deposits, and is then switched to fuel which may have considerable vanadium.

At step 474, computer 402 samples the present output of sensor 406, which represents the airflow rate into primary combustion zone 254. Fuel is pumped to burner 246 at a constant, known rate, so the airflow rate determined at step 474 and the known fuel flow rate permit computer 402 to determine the current fuel/air ratio. The initial values set for the apertures of valves 274 in step 460 create a rich environment in primary combustion zone 254, so the calculated fuel/air ratio permits computer 402 to find the primary zone combustion temperature in step 476 using a relationship such as the one shown at the left-hand side of FIG. 2.

In step 478, the primary zone combustion temperature found in step 476 is compared with the target combustion temperature for the primary combustion zone that was set in step 460. If the temperature found in step 476 is within 10 degrees of the target temperature ("yes" at step 478), the program proceeds to step 480. However, if the temperature is not within 10 degrees of the target temperature ("no" at step 478), whether the temperature is too high or too low needs to be determined. This is done at step 482. If the temperature is too low ("no" at step 482), computer 402 emits a command signal to primary combustion zone air control circuit 412 to drive motors 420 and 422 so as to open control valves 274 by an incremental amount at step 484. As will be apparent from FIG. 2, increasing the air flow rate when the fuel/air ratio is rich tends to make this ratio less rich and to thus raise the combustion temperature. If the temperature found at step 476 is too high ("yes" at step 482), the command signal to primary zone air control circuit 412 causes motors 420 and 422 to close valves 474 by an incremental amount at step 485. As will be appreciated from FIG. 2, this makes the fuel/air ratio richer and thus lowers the combustion temperature.

Computer 402 samples the output of sensor 408 during step 480, and thus receives a direct measurement of the present temperature in quenching zone 256. If the measured quenching zone temperature is within 10 degrees of the target quenching zone temperature that was set during step 460 ("yes" at step 486), the program proceeds to step 490. However, if the measured temperature is lower or higher than the target temperature by more than 10 degrees ("no" at step 486), computer 402 emits a command signal to water valve motor control circuit 414 so as to cause motor 424 to adjust the water flow rate in order to bring it closer to the target temperature. This adjustment occurs during steps 487, 488, and 489.

Computer 402 samples the output of sensor 410 during step 490, and thus receives a direct measurement of the present temperature in secondary combustion zone 258. The measured temperature is checked at step 491 to determine whether it is within 10 degrees of the target temperature set at step 460. If it is ("yes" at step 491), the program returns to step 474. However, if the measured temperature is outside of a 10 degree range around the target temperature ("no" at step 491), a check is made at step 492 to determined whether the measured temperature is higher or lower than the target temperature. If it is lower ("no" at step 492), computer 402 emits a command signal to secondary combustion zone air control circuit 416 which causes it to actuate motors 382 and 418 so as to close valves 282 by an incremental amount (step 494). Closing these valves makes the fuel/air environment in secondary combustion zone 258 less lean. As will be appreciated from FIG. 2, this raises the combustion temperature in secondary combustion zone 258. On the other hand, if the measured temperature is too high ("yes" at step 492), computer 402 emits a command signal which causes secondary combustion zone air control circuit 416 to actuate motors 382 and 418 so as to open valves 282 by an incremental amount and thereby lower the combustion temperature (step 496). Thereafter the program returns to step 474 for another iteration. During each iteration, the air flow rates and water flow rate are adjusted, if necessary, to drive the instantaneous temperatures toward the target temperatures.

The Third Embodiment

Figure 17:
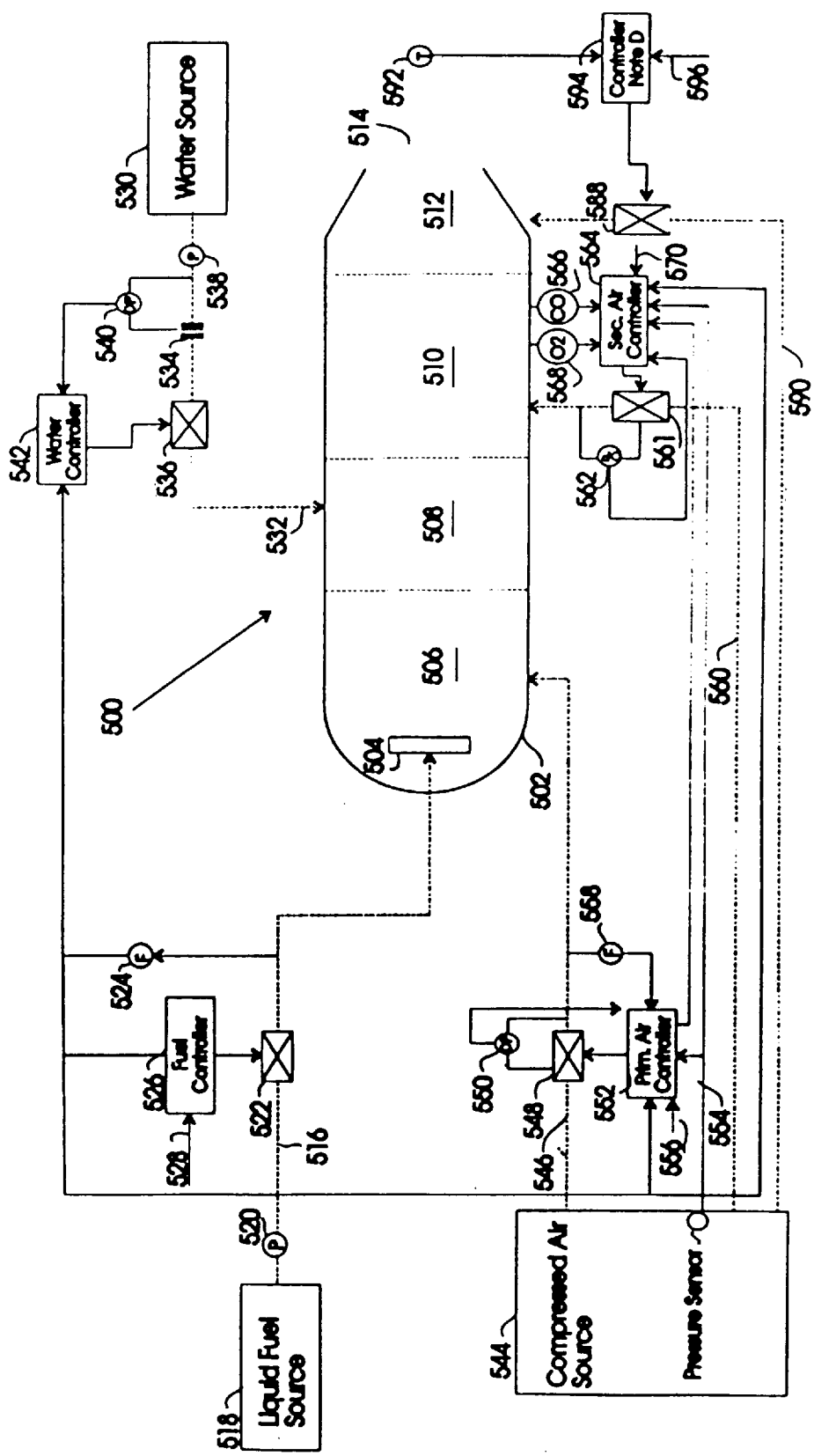
FIG. 17 is a diagram schematically illustrating a third embodiment of the present invention and a system for controlling it.

In FIG. 17, a combustor 500 includes a hollow combustor shell 502 with a burner 504 inside. The interior of shell 502 has a primary combustion zone 506, a quenching zone 508, a secondary combustion zone 510, and mixing zone 512. Combustor 500 terminates in a combustor outlet 514.

A fuel conduit 516 (illustrated using a dot-dash chain line) connects burner 504 to a fuel source 518 via a pump 520 and a motor-controlled fuel valve 522. A flow sensor 524 in fuel conduit 516 measures the rate at which burner 504 receives fuel and provides a measured fuel-rate signal to a flow controller 526. Controller 526 also receives a target fuel-rate signal at an input 528. The target fuel-rate signal is inputted from external equipment, such as an input unit (not illustrated). Fuel controller 526 controls motorized valve 522 so that the measured fuel-rate signal matches the target fuel-rate signal. Consequently, fuel is supplied to burner 504 at a constant rate which is determined by the externally supplied target fuel-rate signal.

A water source 530 is connected by a water conduit 532 (illustrated using a dot-dash chain line) to quenching zone 508. The water from source 530 is pumped through an orifice plate 534 and a motor-controlled water valve 536 by a water pump 538. A differential pressure sensor 540 is connected to water conduit 532 upstream and downstream of the orifice in orifice plate 534 and generates pressure signals which are supplied to a water controller 542. The pressure signals generated by sensor 540 correspond to the actual water pressure upstream and downstream from the orifice, and the difference between these signals represents the differential pressure.

The rate which a fluid flows through an orifice is given by Equation (1), as follows:

$$F = KCD \sqrt{\Delta P \cdot P_u} \qquad (1)$$

In Equation (1), F represents the flow rate of the fluid, C represents the compressibility of the fluid, D represents the density of the fluid, $\Delta P$ represents the differential pressure across the orifice, and $P_u$ represents the pressure upstream of the orifice. The value of the constant K is determined by the dimensions of the orifice in orifice plate 534, the viscosity of the fluid, the geometry of the conduit, and other factors not relevant to the present invention. Water controller 542 receives the pressure signals, which are a measure of the actual flow rate of the water, and the measured fuel-rate signal from flow sensor 524. Controller 542 controls motorized valve 536 so that the flow rate of the water entering quenching zone 508 is a linear function of the measured fuel flow rate. A typical value would be three pounds of water per one pound of fuel.

A compressed air source 544 supplies compressed air to primary combustion zone 506 via a primary zone air path 546 having at least one motorized control valve 548 therein.

Air path 546, like the air paths which will be mentioned later, is illustrated using a dot-dash chain line. Control valve 548 has an aperture that can be adjusted and may be constructed the same as valve 282 (see FIG. 8). A differential pressure sensor 550 senses the difference in air pressure on either side of the aperture of valve 548 and supplies a differential pressure signal ΔP to a primary air controller 552.

Furthermore, primary air controller 552 receives an upstream pressure signal $P_u$ from a pressure sensor 554 in compressed air source 544. The differential air pressure signal from sensor 550 and the upstream air pressure signal from sensor 554 permit controller 552 to determine the air flow rate into primary combustion zone 506 using Equation (1). Controller 552 also receives the measured fuel-rate signal from sensor 524, which permits controller 552 to determine the current fuel/air ratio. Controller 552 also receives a target primary zone combustion temperature from external equipment via an input 556, and adjusts motorized valve 548 to control the degree of richness in primary combustion zone 506 so as to achieve the target combustion temperature.

As was mentioned above, in Equation (1) the constant K depends upon various factors, including the dimensions of the aperture. However, the dimensions of the aperture of valve 548 are variable. Accordingly, when primary air controller 552 calculates the air flow rate it uses different values for K, depending upon the current dimensions of the aperture (mathematically inclined readers will appreciate that K is not really a constant for valve 548, since its aperture is variable and the flow rate through valve 548 is a function of the aperture, but it is nevertheless convenient to avoid introducing another equation by referring to different values of K for different apertures). The different values of K for valve 548 may be determined experimentally by measuring the differential pressure ΔP and the resulting flow rate F at several values of the upstream pressure $P_u$, and by setting the aperture of valve 548 at different values while this is done. The results can be stored in a look-up table for use by controller 552.

A pressure sensor 558 is disposed in primary air path 546 downstream from valve 548. Primary air controller 552 stores a table of pressures that are expected downstream at the location of sensor 558 for various values of the pressure $P_u$, the differential pressure ΔP, and the current aperture setting, and generates an alarm signal if the measured pressure departs from the value given in the table. This table, too, is generated experimentally.

A secondary air path 560 conveys compressed air from source 544 to secondary combustion zone 510 via at least one motorized control valve 561. Like valve 548, valve 561 has an adjustable aperture and may be constructed the same as control valve 282 in FIG. 8. A differential pressure sensor 562 senses the difference in pressure across the aperture and supplies a signal to a secondary air controller 564, which also receives the measured fuel-rate signal from sensor 524 and the upstream pressure signal ($P_u$) from sensor 554. A carbon monoxide sensor 566 and an oxygen sensor 568 are mounted in secondary combustion zone 510, and controller 564 receives these signals, too, along with a secondary zone target temperature signal which is supplied by external equipment to an input 570. In response to these signals, secondary air controller 564 controls the aperture of valve 560 so as to set the leanness in secondary combustion zone 510 at a value which attains the target temperature.

The output of sensor 568 represents the current amount of oxygen in secondary combustion zone 510, but suitable carbon monoxide sensors which detect the current amount of carbon monoxide are not commercially available; typically a delay to 20–30 seconds will be experienced in the carbon monoxide measurement. Fuzzy logic is preferably used to accommodate this delay.

Secondary air controller 564 employs a fuzzy logic control system which takes all of its inputs into account and employs various rules in order to control valve 561 so that some function of the oxygen and carbon monoxide (for example, the sum of these measurements) is minimized without decreasing the air flow to secondary combustion zone 510 below 100% stoichometry. That is, the environment in secondary combustion zone 510 is kept lean, but as close to a stoichiometric mixture of unburned fuel (that is, unburned in primary combustion zone 506) as possible without generating any significant amount of carbon monoxide. Some of the more important aspects of the fuzzy logic employed by controller 564 will discussed below.

Figure 18:
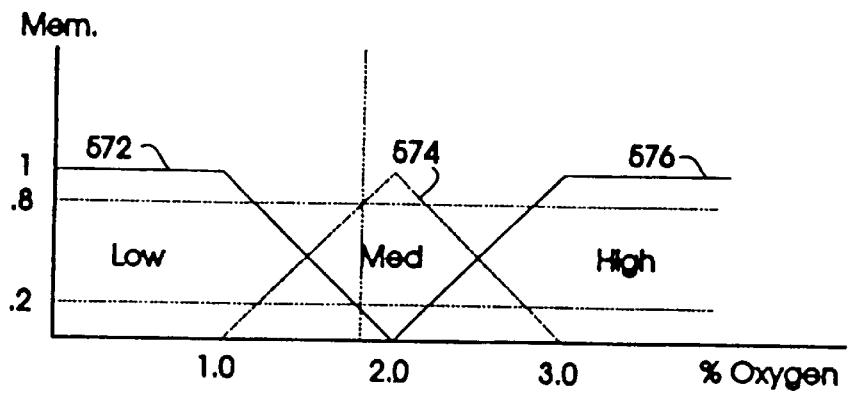
FIGS. 18–20 represent examples of membership functions for use during fuzzy logic control of air flow into the secondary combustion chamber in the third embodiment.

The basic idea behind fuzzy control is that a system or a control action can be described in a set of linguistic rules that are learned by observation, previous experience of an expert operator, or the results of mathematical models or calculations. These rules can be programmed into a digital computer algorithm that processes real-world observations (measurements) and causes something to happen, based on the outcome of which rules apply. At first glance it might appear that this is no more than using a set of IF-THEN-ELSE statements. However it is more that that. This is where the concept of "fuzzy" enters the picture. There exists a set of fuzzy regions in which each input variable has a membership value, from 0 to 1.0. For example, the oxygen values measured by sensor 568 may be divided into three fuzzy regions called LOW, MEDIUM, and HIGH. Let's say that at an $O_2$ content of 1% in secondary combustion zone 510 is deemed to be LOW, that an $O_2$ content of 2% is deemed to be MEDIUM, and that a $O_2$ content of 3% is deemed to be HIGH. The signal from sensor 568 will usually not designate precisely 1%, 2%, or 3% oxygen, but nevertheless these values can provide the basis for constructing membership functions 572, 574, and 576 as shown in FIG. 18. Membership function 572 represents membership in the LOW fuzzy region, membership function 574 represents membership in the MEDIUM fuzzy region, and membership function 578 represents membership in the HIGH fuzzy region. One can then use these fuzzy regions to determine to what degree the actual $O_2$ measured by sensor 568 belongs to the respective fuzzy regions. For example, if the output of sensor 586 indicates 1.8% oxygen in secondary combustion zone 510, the membership in LOW fuzzy region 572 is 0.2, and the membership in MEDIUM fuzzy region 574 is 0.8. In linguistic terms, the $O_2$ is somewhat LOW but mostly MEDIUM.

The rate of change of the oxygen in secondary combustion zone 510, as measured by sensor 568, is also significant. When the oxygen content remains constant at different sampling times, the rate of change is zero. However if the oxygen decreases over time then the rate of change is negative, while if it increases it is positive. Table 1 below illustrates an example of correlations can be established:

TABLE 1

| | |
|---|---|
| NEGATIVE LARGE (NL) | −1.0%/sec. |
| NEGATIVE MEDIUM (NM) | −0.25%/sec. |
| ZERO | 0%/sec. |
| POSITIVE MEDIUM (PM) | +0.25%/sec. |
| POSITIVE LARGE (PL) | +1.0%/sec. |

Figure 19:
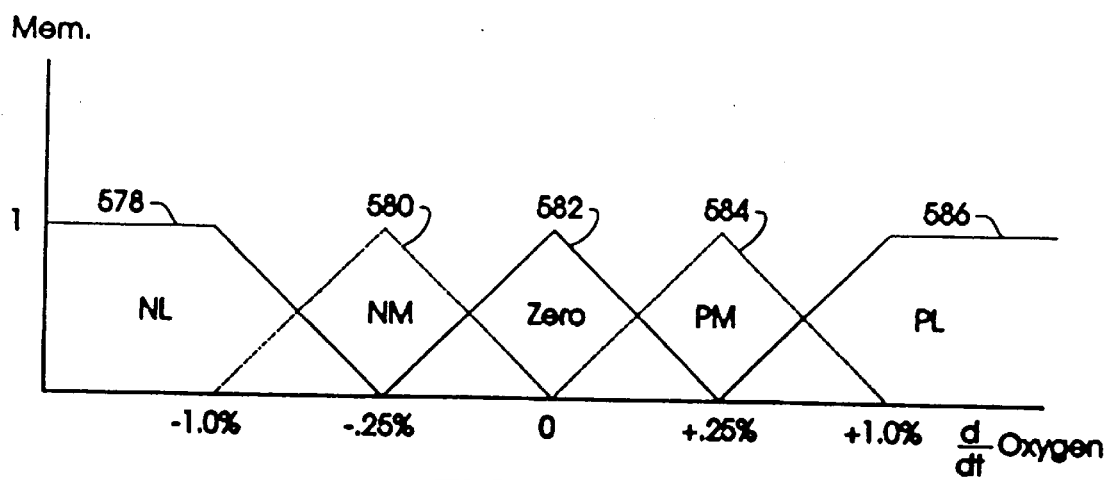

These correlations can be used to define another set of membership functions, as shown in FIG. 19. This Figure illustrates an example of a NEGATIVE LARGE oxygen change rate membership function 578, a NEGATIVE MEDIUM oxygen change rate membership function 580, a ZERO oxygen change rate membership function 582, a POSITIVE MEDIUM oxygen change rate membership function 584 and a POSITIVE LARGE oxygen change rate membership function 586.

In a fuzzy logic controller, the memberships in input fuzzy sets are used, through the logic of rules that have been established, to generate a membership in a fuzzy region of the control for an output fuzzy set. Say, for example, that Table 2 below represents a correlation based on the rate at which air flowing through valve 561 into secondary combustion chamber 510 changes over time:

TABLE 2

| | |
|---|---|
| NEGATIVE LARGE (NL) | −10%/sec. |
| NEGATIVE MEDIUM (NM) | −5%/sec. |
| ZERO | 0%/sec. |
| POSITIVE MEDIUM (PM) | +5%/sec. |
| POSITIVE LARGE (PL) | +10%/sec. |

Figure 20:
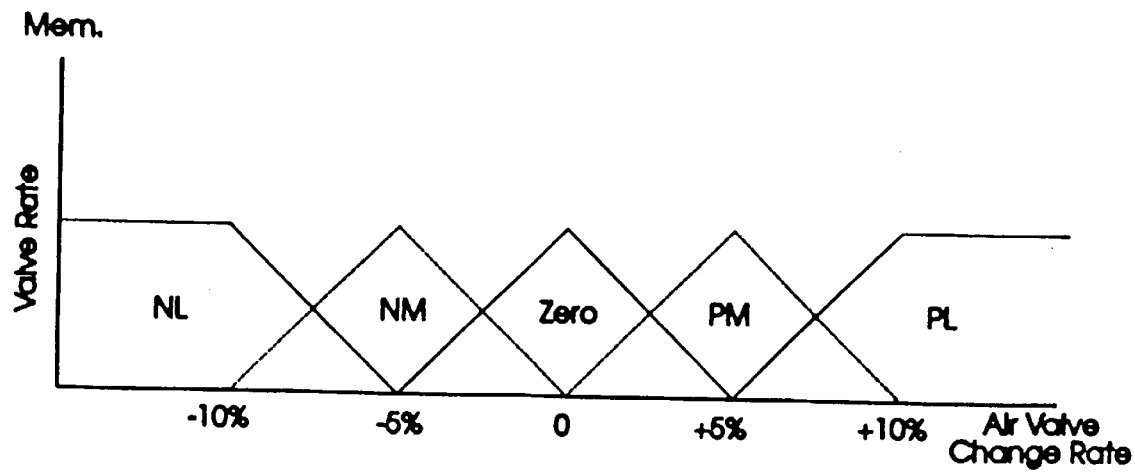

FIG. 20 then illustrates an example of the set of membership functions for changing valve 561.

An example of rules which could be applied by secondary air controller 564, based only on the oxygen content measured by sensor 568 (see FIG. 18) and the rate at which the oxygen changes (see FIG. 19), could be as shown in Table 3 below:

TABLE 3

A. IF % OXYGEN IS LOW and d/dt O$_2$ IS POSITIVE MEDIUM, then AIR VALVE CHANGE RATE is NEGATIVE MEDIUM;
B. IF % OXYGEN IS HIGH and d/dt O$_2$ IS POSITIVE HIGH, then AIR VALVE CHANGE RATE is NEGATIVE HIGH; and
C. IF % OXYGEN IS LOW and d/dt O$_2$ IS ZERO, then AIR VALVE CHANGE RATE is ZERO.

In reality, secondary air controller 564 receives more inputs than those explained in the simple example presented above, and uses more rules. For example, due to the fact that oxygen sensor 568 does not give any information below 0%, the stoichiometry calculated from fuel flow and air flow and perhaps CO can be used to determine the control action to valve 561 at less than stoichiometric conditions. A person ordinarily skilled in the art will appreciate that rules which contribute to controlling the flow of air into secondary combustion zone 510 based on the inputs to secondary air controller 564 can easily be added.

In a nutshell, rules that "fire" in a fuzzy logic controller, such as secondary air controller 564, cause a membership in an input set to be applied to an output set, and the end result, the control variable, is equivalent to the centroid of all of the output regions and their membership. Fuzzy logic fits best when variables are continuous and/or adequate mathematical models do not exist.

Figure 4:
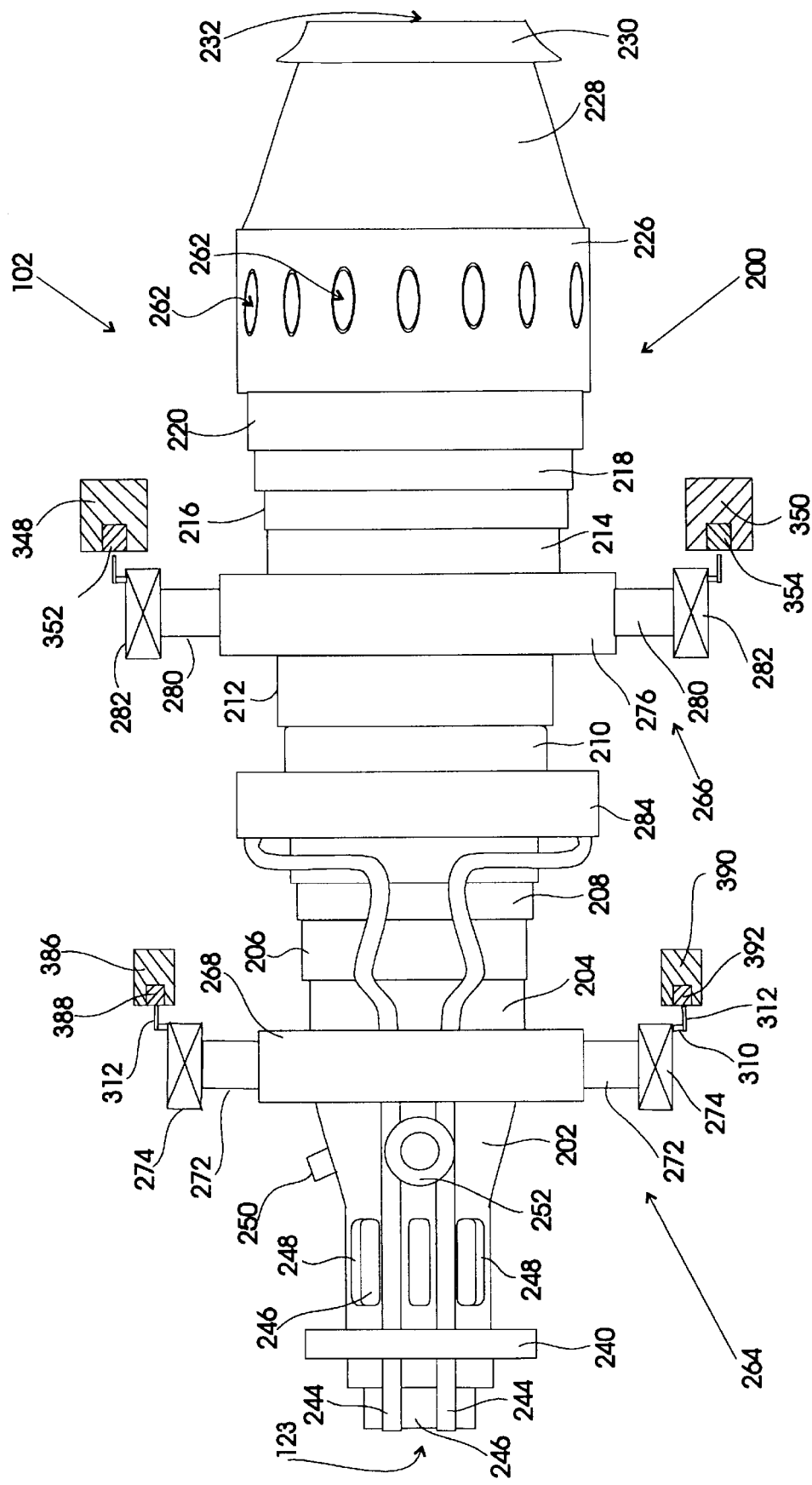
FIG. 4 is a front plan view of a combustor in accordance with the second embodiment, and additionally illustrates rails which cooperate with the combustor.
Figure 5:
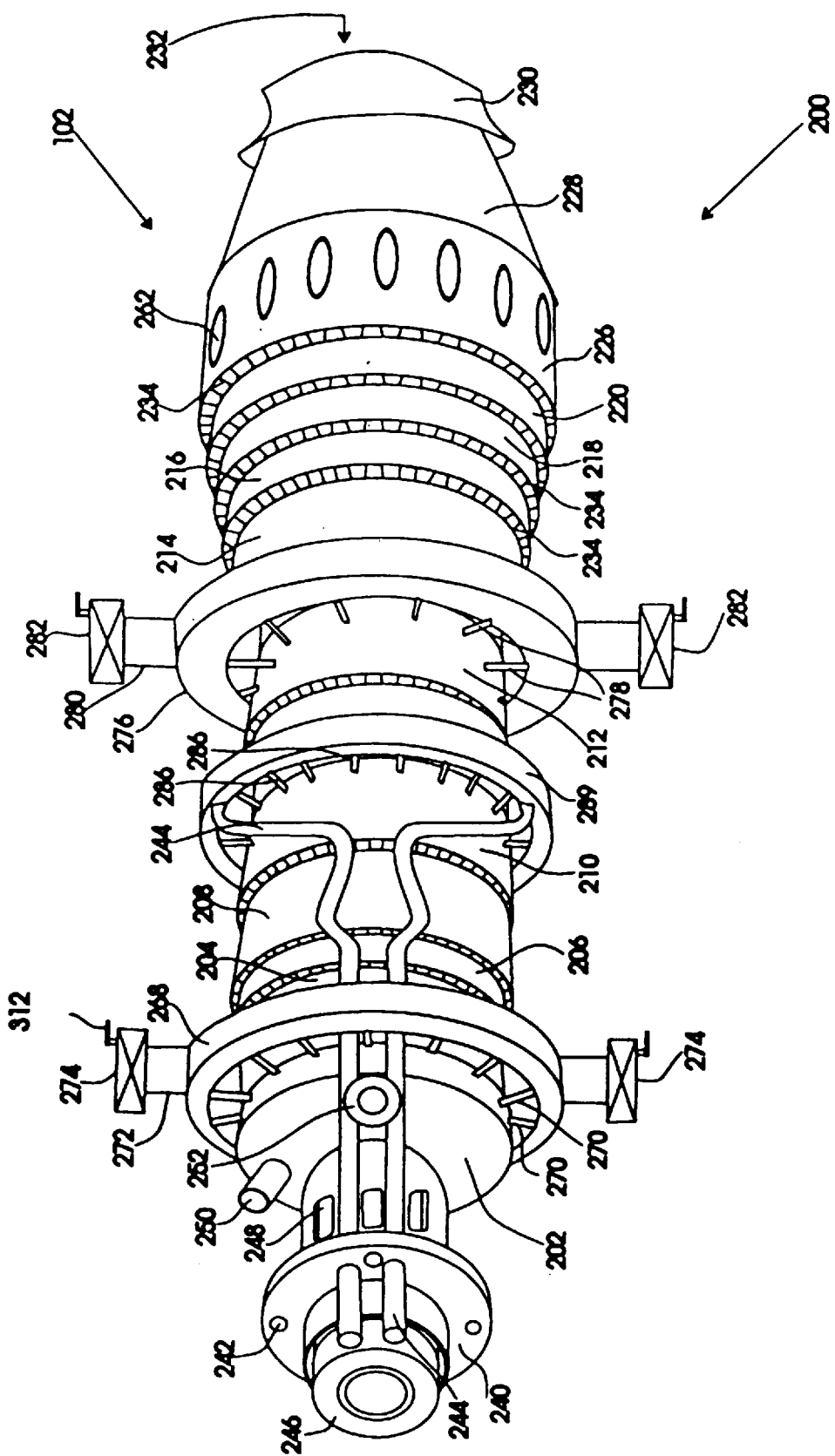
FIG. 5 is a perspective view of the combustor of the second embodiment.

In the second embodiment of the present invention, compressed air was admitted to the mixing zone through fixed scoops 262 (see FIGS. 4–6). In the present embodiment, however, at least one motorized control valve 588 (see FIG. 17) is disposed in a mixing zone air path 590 between compressed air source 544 and mixing zone 512. Control valve 588 has a variable aperture and may have the same construction as valve 282 in FIG. 8. A temperature sensor 592 downstream from combustor outlet 514 supplies a signal to a mixer air controller 594, which also receives a mixing zone target temperature signal from external equipment on an input 596. Controller 594 adjusts motorized valve 588 so as to make the temperature measured by sensor 592 correspond to the target temperature.

The Fourth Embodiment

Figure 21:
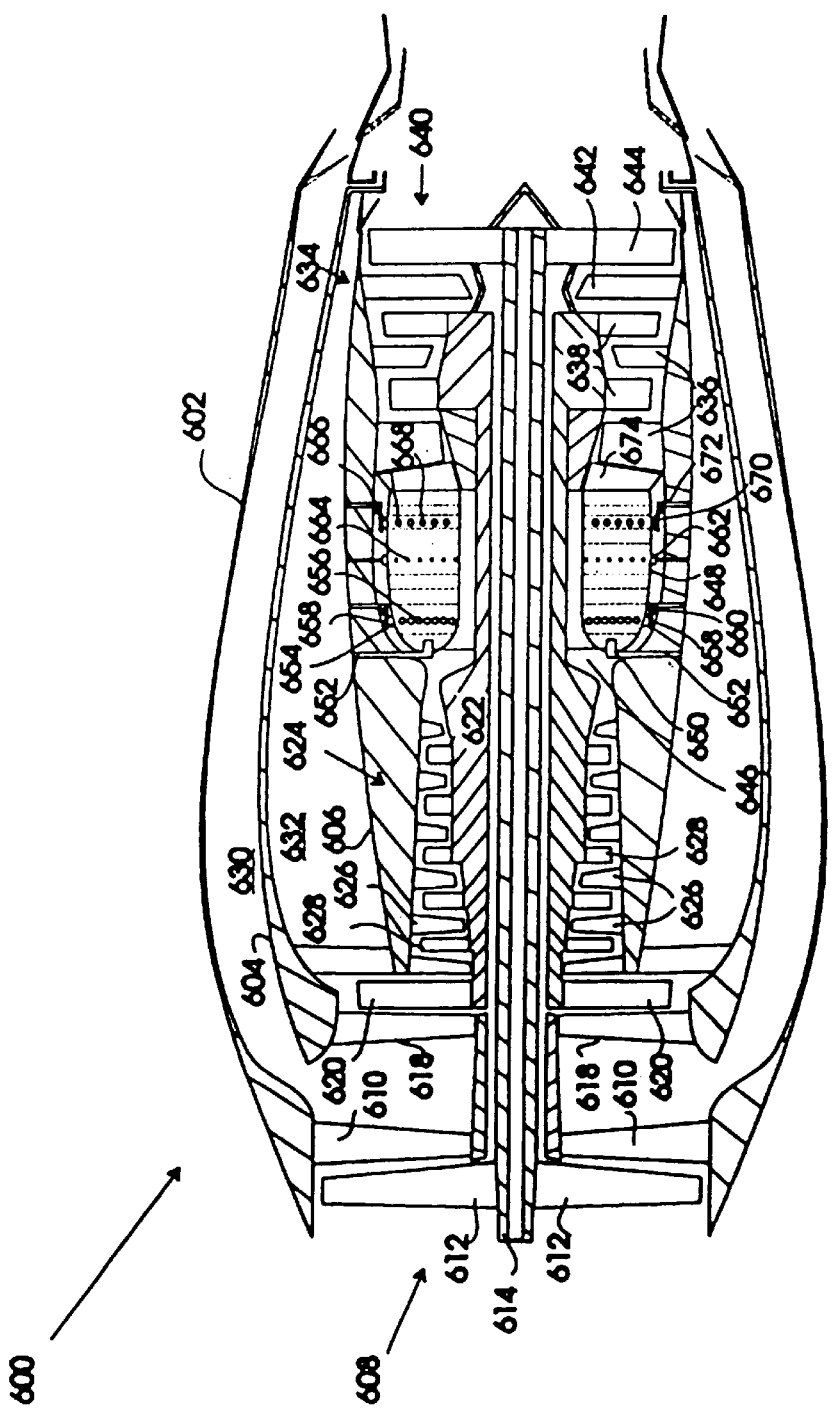
FIG. 21 is a cross-sectional view of a jet engine using a combustor in accordance with a fourth embodiment of the present invention.

In FIG. 21, a jet engine 600 includes an outer housing 602, an intermediate housing 604, and an inner housing 606. An initial compressor stage 608 includes stationary vanes 610 which are mounted on outer housing 602 and rotating vanes 612 which are fixed to a hollow inner shaft 614. An intermediate compressor stage 616 includes stationary vanes 618 which are connected to intermediate housing 604 and rotating vanes 620 which are connected to a rotating member 622. A final compressor stage 624 includes stationary vanes 626 which are connected to housing 606 and rotating vanes 628 which are connected to member 622. Some of the air compressed by initial compressor stage 608 flows through a channel 630 between housing 602 and housing 604, and the rest is received by intermediate compressor stage 616. Some of the air received by intermediate compressor stage 616 flows through a channel 632 between housing 604 and housing 606, and the rest is received by final compressor stage 624. Shaft 614 and member 622 are disposed coaxially and are mounted (by means not shown) for rotation independent of one another.

An initial turbine stage 634 includes stationary turbine vanes 636 which are mounted on housing 606 and rotating turbine vanes 638 which are mounted on member 622. A final turbine stage 640 includes stationary turbine vanes 642 which are mounted on housing 606 and rotating turbine vanes 644 which are mounted on shaft 614. It will be apparent that initial turbine stage 634 drives intermediate compressor stage 616 and final compressor stage 624 via member 622, while final turbine 640 stage drives initial compressor stage 608 via shaft 614.

A combustor 646 in accordance with the present invention is disposed in a cavity between housing 606 and member 622. Combustor 646, which is known as a radial combustor, is toroidal in shape; that is, it has a central opening, through which member 622 and shaft 614 extend. Combustor 646 includes a combustor shell 648 having small openings (not numbered) therein to permit entry of a small amount of air to cool shell 648. Combustor 646 also includes an annular burner 650 which receives fuel via fuel passages 652. Combustor 646 also includes an annular primary air distribution conduit 654 which is connected to shell 648 and which supplies air to a primary combustion zone (not numbered) via openings 656. Control valves 658, which may be of the same construction as valves 282 shown in FIG. 8 but of smaller size, are mounted on conduit 654 to control the rate at which air is admitted thereto. Control valves 658 are adjusted by an adjustment ring arrangement 660 which is mounted on housing 606. Adjustment ring arrangement 660 corresponds to stationary ring 348 and adjustable ring 352 shown in FIG. 12, and may be adjusted by a ring rotation mechanism similar to that shown in FIG. 13.

Combustor 646 also includes an annular water distribution conduit 662 which sprays water through nozzles 664 to a quenching zone (not numbered) in combustor 646.

An annular secondary air distribution conduit 666 is connected to shell 648 and provides compressed air to a secondary combustion zone (not numbered) in combustor 646 through openings 668 in shell 648. Control valves 670, which again may be the same in construction as valve 282 in FIG. 8 but smaller in size, control entry of air into distribution conduit 666 and thus into the secondary combustion zone. Valves 670 are operated by an adjustment ring arrangement 672, corresponding to the rings 348 and 352 shown in FIG. 12. Hot gas from the secondary combustion zone flows from the combustor outlet (not numbered) of combustor 646 via a transition member 674 to turbine stage 634.

As in previous embodiments, part of the fuel burns in the primary combustion zone in a rich fuel/air environment. This reduces the amount of $V_2O_5$ that is formed and increases the amounts of the $V_2O_3$ and $V_2O_4$ that are formed. The hot gas generated in the primary combustion zone includes an unburned portion of the fuel. This hot gas is quickly cooled in the quenching zone, thereby transforming any $V_2O_5$ that was formed in the primary combustion zone to $V_2O_3$ or $V_2O_4$. These compounds have a high melting point and thus do not melt in the secondary combustion zone even though air is introduced thereto via control valves 670 so as to burn the previously-unburned portion of the fuel. The combustion in the secondary combustion zone raises the temperature of the gas supplied to turbine stages 634 and 640. The air introduced into the secondary combustion zone is preferably controlled so that the combustion therein occurs at stoichiometric or near-stoichiometric (but slightly lean) conditions. However, leaner conditions can be established in the secondary combustion zone, if desired, in order to reduce the temperature of the gas from combustor 646.

It will be understood that the above description of the present invention is susceptible to various modifications, changes, and adaptations, and the same are intended to be comprehended within the meaning and range of equivalents of the appended claims.

What I claim is:

1. A combustor, comprising:
   a burner for burning a liquid fuel;
   a hollow combustor shell having an interior and including a primary combustion zone having a temperature, $T_1$, a quenching zone having a temperature $T_2$, a secondary combustion zone having a temperature $T_3$, and a combustor outlet for releasing hot gas from the interior, the burner being disposed at the primary combustion zone in the interior of the combustor shell and the secondary combustion zone being disposed between the quenching zone and the combustor outlet such that $T_1$, is greater than $T_3$;
   first means for injecting air into the primary combustion zone so as to provide a rich fuel/air environment in which to burn the liquid fuel in the primary combustion zone, and comprising adjustable means for adjustably admitting air to the primary combustion zone;
   means for carrying hot gas and unburned fuel from the primary combustion zone to the quenching zone;
   means for rapidly cooling the hot gas in the quenching zone; and
   second means for injecting air into the secondary combustion zone so as to provide an environment in which to burn the unburned fuel from the primary combustion zone.

2. The combustor of claim 1, wherein the second means for injecting air provides a lean fuel/air environment in which to burn the unburned fuel from the primary combustion zone in the secondary combustion zone.

3. The combustor of claim 1, wherein the first means for injecting air comprises permanently open apertures in the combustor shell for admitting additional air to the primary combustion zone.

4. The combustor of claim 3, wherein the means for adjustably admitting additional air to the primary combustion zone comprises a control valve.

5. The combustor of claim 3, wherein the means for adjustably admitting additional air to the primary combustion zone comprises a primary air supply mechanism which includes a distribution conduit outside of the combustor shell, a control valve to admit air into the distribution conduit, and pipes to convey air from the distribution conduit into the combustor shell.

6. The combustor of claim 5, in combination with a turbine disposed at the combustor outlet for rotation by hot gas from the combustor outlet, a compressor driven by the turbine for compressing the air injected into the combustor, and adjustment system means for adjusting the control valve.

7. The combustor of claim 5, wherein the distribution conduit is annular and encircles the combustor shell, and wherein the pipes extend radially from the combustor shell to the distribution conduit.

8. The combustor of claim 5, wherein the second means for injecting air comprises further permanently open apertures in the combustor shell for admitting air to the secondary combustion zone, and means for adjustably admitting additional air to the secondary combustion zone.

9. The combustor of claim 8, wherein the means for adjustably admitting additional air to the secondary combustion zone comprises a secondary air supply mechanism which includes a further distribution conduit outside the combustor shell, a further control valve to admit air into the further distribution conduit, and further pipes to convey air from the further distribution conduit into the combustor shell.

10. The combustor of claim 9, wherein the means for cooling the hot gas in the quenching zone comprises means for spraying water into the quenching zone.

11. The combustor of claim 10, in combination with a turbine disposed at the combustor outlet for rotation by hot gas from the combustor outlet, a compressor driven by the turbine for compressing the air injected into the combustor, and adjustment system means for adjusting the control valve and the further control valve.

12. The combustor of claim 1, wherein the second means for injecting air comprises permanently open apertures in the combustor shell for admitting air to the secondary combustion zone, and means for adjustably admitting additional air to the secondary combustion zone.

13. The combustor of claim 12, wherein the means for adjustably admitting additional air to the secondary combustion zone comprises a control valve.

14. The combustor of claim 13, in combination with a turbine disposed at the combustor outlet for rotation by hot gas from the combustor outlet, a compressor driven by the turbine for compressing the air injected into the combustor, and adjustment system means for adjusting the control valve.

15. The combustor of claim 1, wherein the liquid fuel burner is a liquid hydrocarbon fuel burner.

16. The combustor of claim 1, wherein the means for cooling the hot gas reduces the hot gas temperature to about 1400° F.

17. The combustor of claim 1, wherein said adjustable means comprises a continuously adjustable control valve connected to said primary combustion zone, and having:
   an annular stationary ring;
   a plurality of control leaves, each being pivotally connected to said stationary ring; and an annular rotatable ring having the control leaves attached thereto, whereby rotation of said annular rotatable ring relative to said annular stationary ring causes said control leaves to move, and obstruct or open an air opening into said primary combustion zone, and defined by said rings.

18. The combustor of claim 17, wherein said first means for injecting air further comprises a distribution conduit connecting said primary combustion zone with said control valve.

19. The combustor of claim 1, wherein said second means for injecting air includes a continuously adjustable control valve connected to said secondary combustion zone, and having:
- an annular stationary ring;
- a plurality of control leaves, each being pivotally connected to said stationary ring; and
- an annular rotatable ring having the control leaves attached thereto, whereby rotation of said annular rotatable ring relative to said annular stationary ring causes said control leaves to move, and obstruct or open an air opening into said second combustion zone, and defined by said rings.

20. A combustor, comprising:
- a burner for burning a liquid fuel having a vanadium content exceeding 90 parts per million;
- a hollow combustor shell having an interior and including a primary combustion zone having a temperature $T_1$, a quenching zone having a temperature $T_2$, a secondary combustion zone having a temperature $T_3$, and a combustor outlet for releasing hot gas from the interior, the burner being disposed at the primary combustion zone in the interior of the combustor shell and the secondary combustion zone being disposed between the quenching zone and the combustor outlet such that $T_1$ is at least 1000° F. greater than $T_3$;
- first means for injecting air into the primary combustion zone so as to provide a rich fuel/air environment in which to burn the liquid fuel in the primary combustion zone, such that some of the fuel remains unburned and the unburned fuel contains liquid vanadium pentoxide;
- means for carrying hot gas and the unburned fuel from the primary combustion zone to the quenching zone;
- means for cooling the hot gas and the unburned fuel in the quenching zone so as to convert the liquid vanadium pentoxide to vanadium trioxide dust; and
- second means for injecting air into the secondary combustion zone so as to provide an environment in which to burn the unburned fuel from the primary combustion zone.

21. The combustor of claim 20, wherein the means for cooling the hot gas further cools the hot gas and unburned fuel in the quenching zone so as to convert the liquid vanadium pentoxide to vanadium tetroxide dust.

22. A combustor, comprising:
- a burner for burning a liquid fuel;
- a hollow combustor shell having an interior and including a primary combustion zone having a temperature $T_1$, a quenching zone having a temperature $T_2$, a secondary combustion zone having a temperature $T_3$, and a combustor outlet for releasing hot gas from the interior, the burner being disposed at the primary combustion zone in the interior of the combustor shell and the secondary combustion zone being disposed between the quenching zone and the combustor outlet such that $T_1$, is greater than $T_3$;
- an adjustable control valve connected to the primary combustion zone for adjustably admitting air to the primary combustion zone so as to provide a rich fuel/air environment in which to burn the liquid fuel in the primary combustion zone;
- means for carrying hot gas and unburned fuel from the primary combustion zone to the quenching zone;
- means for cooling the hot gas in the quenching zone; and
- means for injecting air into the secondary combustion zone so as to provide an environment in which to burn the unburned fuel from the primary combustion zone.

* * * * *